US011770805B2

(12) United States Patent
Kitazato et al.

(10) Patent No.: US 11,770,805 B2
(45) Date of Patent: *Sep. 26, 2023

(54) RECEPTION APPARATUS, RECEPTION METHOD, TRANSMISSION APPARATUS, AND TRANSMISSION METHOD

(71) Applicant: SATURN LICENSING LLC, New York, NY (US)

(72) Inventors: Naohisa Kitazato, Tokyo (JP); Jun Kitahara, Shizuoka (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,824

(22) Filed: Jul. 18, 2022

(65) Prior Publication Data

US 2023/0038527 A1   Feb. 9, 2023

Related U.S. Application Data

(63) Continuation of application No. 16/514,651, filed on Jul. 17, 2019, now Pat. No. 11,399,360, which is a
(Continued)

(30) Foreign Application Priority Data

May 16, 2014   (JP) ................... 2014-102316

(51) Int. Cl.
*H04W 72/02*   (2009.01)
*H04H 40/18*   (2008.01)
(Continued)

(52) U.S. Cl.
CPC ............ *H04W 72/02* (2013.01); *H04H 40/18* (2013.01); *H04H 60/82* (2013.01); *H04L 12/18* (2013.01);
(Continued)

(58) Field of Classification Search
CPC ...... H04W 72/02; H04W 72/30; H04H 40/18; H04H 60/82; H04L 12/18; H04L 12/189; H04N 21/41407; H04N 21/64322
See application file for complete search history.

(56) References Cited

U.S. PATENT DOCUMENTS 9,456,167 B2 *   9/2016   Hong ................. H04N 21/8133
9,521,436 B2 *   12/2016  Song .................. H04N 21/4382
(Continued)

FOREIGN PATENT DOCUMENTS

EP   2071795        6/2009
JP   2005175556     6/2005
JP   2012244496     12/2012

OTHER PUBLICATIONS

Office Action dated Jul. 30, 2018 in European Application No. 15793134.6—* cited in parent application.
(Continued)

*Primary Examiner* — Harry H Kim
(74) *Attorney, Agent, or Firm* — Chris Kolefas

(57) ABSTRACT

The present technology relates to a reception apparatus, a reception method, a transmission apparatus, and a transmission method, by which channel selection information can be acquired more efficiently. Provided is a reception apparatus, including: a reception unit that receives a broadcast wave of digital broadcasting using an IP (Internet Protocol) transmission system; a communication unit that receives first signaling information for acquiring broadcast content transmitted by the broadcast wave through communication with a server via a network; an acquisition unit that acquires, on the basis of the first signaling information, a physical parameter used in a physical layer in a hierarchy of a protocol of the IP transmission system; and a control unit that controls, on the basis of the physical parameter, operations of respective units that perform channel selection
(Continued)

processing. The present technology is applicable to a portable receiver that is movable, for example.

17 Claims, 32 Drawing Sheets

Related U.S. Application Data continuation of application No. 15/309,845, filed as application No. PCT/JP2015/063059 on May 1, 2015, now Pat. No. 10,462,768.

(51) Int. Cl.
| | |
|---|---|
| *H04H 60/82* | (2008.01) |
| *H04L 12/18* | (2006.01) |
| *H04N 21/414* | (2011.01) |
| *H04N 21/643* | (2011.01) |
| *H04L 65/1101* | (2022.01) |
| *H04L 69/16* | (2022.01) |
| *H04W 72/30* | (2023.01) |

(52) U.S. Cl.
CPC ..... *H04L 12/189* (2013.01); *H04N 21/41407* (2013.01); *H04N 21/64322* (2013.01); *H04W 72/30* (2023.01)

(56) References Cited

U.S. PATENT DOCUMENTS

| | | | |
|---|---|---|---|
| 10,462,768 B2 | 10/2019 | Kitazato et al. | |
| 11,399,360 B2* | 7/2022 | Kitazato | H04N 21/41407 |
| 2006/0212902 A1 | 9/2006 | Seo et al. | |
| 2008/0072259 A1 | 3/2008 | Seo et al. | |
| 2008/0201738 A1 | 8/2008 | Song et al. | |
| 2009/0248880 A1* | 10/2009 | Kim | G06Q 30/0601 709/227 |
| 2010/0319024 A1 | 12/2010 | Hiraoka | |
| 2011/0016171 A1 | 1/2011 | Kim et al. | |
| 2011/0116491 A1* | 5/2011 | Kovacs | H04N 21/64322 370/345 |
| 2012/0096504 A1* | 4/2012 | Waller | H04H 60/82 709/219 |
| 2012/0147273 A1* | 6/2012 | Mourad | H04W 72/30 725/116 |
| 2012/0275455 A1 | 11/2012 | Hwang et al. | |
| 2012/0320894 A1 | 12/2012 | Van Rooyen | |
| 2013/0182067 A1 | 7/2013 | Otsuka et al. | |
| 2013/0219431 A1 | 8/2013 | Hong et al. | |
| 2014/0089959 A1 | 3/2014 | Oh et al. | |
| 2014/0380135 A1 | 12/2014 | Hong et al. | |
| 2016/0142770 A1* | 5/2016 | Waller | H04N 21/4302 725/110 |
| 2016/0212472 A1* | 7/2016 | Shirasuka | H04N 21/4394 |
| 2016/0352793 A1 | 12/2016 | Lee et al. | |
| 2017/0126457 A1 | 5/2017 | Ko et al. | |
| 2019/0342862 A1 | 11/2019 | Kitazato et al. | |

OTHER PUBLICATIONS

Extended European Search Report dated Sep. 29, 2017 in Patent Application No. 15793134.6—* cited in parent application.
Digital Video Broadcasting (DVB): Specification for Service Information (SI) in DVB Systems, ETSI EN 300 468, V1 .14.1, XP014196488, Oct. 2013, 176 pages—* cited in parent application.
Digital Video Broadcasting (DVB); Frame Structure Channel Coding and Modulation for a Second Generation Digital Terrestrial Television Broadcasting System (DVB-T2), ETSI EN 302 755 V1.3.1 (Apr. 2012), pp. 4—* cited in parent application.
Digital Video Broadcasting (DVB); Frame Structure Channel Coding and Modulation for a Second Generation Digital Terrestrial Television Broadcasting System, (DVB-T2), ETSI EN 302 755, V1 .3.1, Apr. 2012, pp. 67-68—* cited in parent application.

* cited by examiner

FIG. 5

| | | | | SCD | |
|---|---|---|---|---|---|
| Element/Attribute(with@) | | | | Cardinality | Description |
| Scd | | | | 1 | Service configuration description |
| | @majorProtocolversion | | | 0..1 | Major Protocol Version default="1" |
| | @minorProtocolversion | | | 0..1 | Minor Protocol Version default="0" |
| | @RFchannelId | | | 1 | RF channel ID |
| | @name | | | 0..1 | Broadcaster name for each Physical Channel |
| | Tuning_RF | | | 1 | |
| | | @frequency | | 1 | Center frequency of this RF channel |
| | | PreambleL1Pre | | 0..1 | Preamble L1-pre data |
| | BBPStream | | | 1..n | BBP stream |
| | | @bbpStreamId | | 1 | BBP stream ID |
| | | @payloadType | | 1 | BBP payload type "ipv4" , "ipv6" , "ts" |
| | | @name | | 0..1 | BBP stream name |
| | | ESGBootstrap | | 0..1 | Access information for ESG |
| | | | ESGProvider | 1..n | ESG provider |
| | | | @providerName | 1 | ESG provider name |
| | | | ESGBroadcastLocation | 0..1 | ESG location from broadcast |
| | | | @RFchannelId | 1 | RF channel ID for ESG service |
| | | | @BBPStreamId | 1 | BBP stream ID for ESG service |
| | | | @ESGServiceId | 1 | Service ID for ESG service |
| | | | ESGBroadbandLocation | 0..1 | ESG location from broadband |
| | | | @ESGurl | 1 | URL for ESG files |
| | | ClockReferenceInformation | | 0..1 | Clock Reference related information |
| | | | @sourceIPAddress | 1 | Source IP address for Clock reference transmission |
| | | | @destinationIPAddress | 1 | Destination IP address for Clock reference transmission |
| | | | @portNum | 1 | UDP port number for Clock reference transmission |
| | | | @clockReferenceFormat | 0..1 | Clock reference type "NTPnormal" , "NTP27M" |
| | | Tuning_BBPS | | 1 | Physical parameter |
| | | | @plpId | 1 | PLP id for this BBP stream |
| | | | PreambleL1post | 0..1 | |
| | | Service | | 1..n | Service |
| | | | @serviceId | 1 | Service ID |
| | | | @serviceType | 1 | Service type "continuous" , "scripted" , "esg" |
| | | | @hidden | 0..1 | Hidden service or not "on" , "off" |
| | | | @hiddenGuide | 0..1 | Hidden service on ESG "on" , "off" |
| | | | @shortName | 1 | Short service name ≤7 character |
| | | | @longName | 0..1 | Long service name |
| | | | @accessControl | 0..1 | Access controlled service or not "on" , "off" |
| | | | SourceOrigin | 1 | Original service as source |
| | | | @country | 1 | Country code |
| | | | @originalRFChannelId | 1 | Original RF channel ID |
| | | | @bbpStreamId | 1 | BBP stream ID |
| | | | @serviceId | 1 | Service ID |
| | | | SCSbootstrap | 1 | Access information for service channel |
| | | | @sourceIPAddress | 1 | Source IP address to transmit service |
| | | | @destinationIPAddress | 1 | Destination IP address to transmit service |
| | | | @portNum | 1 | Port number to transmit SCS |
| | | | @tsi | 1 | FLUTE Session TSI to transmit SCS |
| | | | AssociatedService | 0..n | Associated service |
| | | | @RFChannelId | 0..1 | RF channel ID |
| | | | @bbpStreamId | 0..1 | BBP stream ID |
| | | | @serviceId | 1 | Service ID |

| Session | Line | English name | Necessary | Plurality | Content |
|---|---|---|---|---|---|
| Session Description | v= | protocol version | ○ | | Represent version of protocol; "0" is necessarily used in RFC2327 |
| | o= | origin | ○ | | Represent information on creator of SDP description document, and used as session description ID or for ordering guarantee at update time |
| | s= | session name | ○ | | Represent name of session |
| | i= | session information | | | Represent information relating to session |
| | u= | URI | | | Represent URI that is capable of acquiring added information relating to session |
| | e= | email address | △ | | Represent contact e-mail address of chief administrator of session |
| | p= | phone number | △ | | Represent contact telephone number of chief administrator of session |
| | c= | connection data | △ | | Represent information on network address used in session |
| | b= | (session) bandwidth | | | Represent bandwidth of medium used in session |
| Time Description | t= | timing | ○ | ○ | Represent valid start time and finish time of session |
| | r= | repeat times | | ○ | Represent repeating period or the like in case where session becomes valid periodically and repeatedly |
| | z= | time zones | | | Represent offset time in case where switching of summer time and winter time or the like is necessary, in case where repeat is specified in Time Description ("line of r=") |
| | k= | encryption keys | | | Represent encryption key used in session or information thereon |
| | a= | (session) attributes | | ○ | Represent various pieces of information relating to session |
| Media Description | m= | media announcements | ○ | ○ | Represent type of media |
| | i= | media information | | | Represent information relating to media |
| | c= | connection data | △ | | Represent information on network address used in media |
| | b= | (media) bandwidth | | | Represent bandwidth used in media stream |
| | k= | encryption keys | | | Represent encryption key used in media or information thereon |
| | a= | (media) attributes | | ○ | Represent various attributes relating to media |

FIG.6

| Attribute type | Value | Meaning |
|---|---|---|
| a=ptime | Data amount in packet (ms) | Represent length of medium included in one packet (packet transmission interval in case of continuous data) |
| a=fmtp | Format and parameter | Represent format used in medium and particular parameter necessary for format |
| a=sendrecv | Nothing | Represent that medium is transmitted/received bidirectionally |
| a=recvonly | Nothing | Represent that medium is received only |
| a=sendonly | Nothing | Represent that medium is transmitted only |
| a=inactive | Nothing | Represent that medium is not transmitted bidirectionally; it is used in case where transmission/reception of medium is suspended in process of session or in case where port number, codec, or the like is ensured before start of session |
| a=rtpmap | Payload type and coding type | Represent mapping of payload and coding type |
| a=representation-id | Representation ID | Represent representation ID |

FIG.7

```
v=0
o=user123 2890844526 2890842807 IN IP6 2201:056D::112E:144A:1E24
s=One Video with one audio delivery session example
t=2873397496 2873404696
c=IN IP6 FF1E:03AD::7F2E:172A:1E24/1
a=source-filter: incl IN IP6 * 2001:210:1:2:240:96FF:FE25:8EC9
m=application 67890 FLUTE/UDP 0
b=5064
a=flute-tsi:3
a=representation-id:23
a=representation-id:45
```

FIG.9

```
v=0
o=user123 2890844526 2890842807 IN IP6 2201:056D::112E:144A:1E24
s=One Video with one audio delivery session example
t=2873397496 2873404696
c=IN IP6 FF1E:03AD::7F2E:172A:1E24/1
a=atsc-serviceidentifier:US:13:1:183
a=source-filter: incl IN IP6 * 2001:210:1:2:240:96FF:FE25:8EC9
m=application 67890 FLUTE/UDP 0
b=5064
a=flute-tsi:3
a=representation-id:23
a=representation-id:45
```

FIG.12

```
a=atsc-serviceidentifier:<region>:<RFChannelId>:<BBPStreamId>:<serviceId> region: 2 letter country codes
```

FIG.13

```
v=0
o=user123 2890844526 2890842807 IN IP6 2201:056D::112E:144A:1E24
s=One Video with one audio delivery session example
t=2873397496 2873404696
c=IN IP6 FF1E:03AD::7F2E:172A:1E24/1
a=frequency:4731428857
a=plpid:2
a=preamble:XXXXX.....XX
a=source-filter: incl IN IP6 * 2001:210:1:2:240:96FF:FE25:8EC9
m=application 67890 FLUTE/UDP 0
b=5064
a=flute-tsi:3
a=representation-id:23
a=representation-id:45
```

FIG.16 a=frequency: Center frequency
a=plpId: PLP identifier
a=preamble: Preamble value (control parameter)

FIG.17

```
a=atsc_physical_tuning:<frequency>:<plpid>:<preamble>
```

FIG.18

```
v=0
o=user123 2890844526 2890842807 IN IP6 2201:056D::112E:144A:1E24
s=One Video with one audio delivery session example
t=2873397496 2873404696
c=IN IP6 FF1E:03AD::7F2E:172A:1E24/1
a=frequency:473142857
a=l1-pre:xxxxx....xx
a=l1-post:yyyyy...yy
a=source-filter: incl IN IP6 * 2001:210:1:2:240:96FF:FE25:8EC9
m=application 67890 FLUTE/UDP 0
b=5064
a=flute-tsi:3
a=representation-id:23
a=representation-id:45
```

FIG.19 a=frequency : Center frequency
a=l1_pre : Preamble L1-pre signaling value
a=l1-post : Value of target PLP of preamble L1-post signaling

FIG.20

```
a=atsc_physical_tuning:<frequency>:<l1-pre>:<l1-post>
```

FIG.21

RECEPTION APPARATUS, RECEPTION METHOD, TRANSMISSION APPARATUS, AND TRANSMISSION METHOD

CROSS REFERENCE TO RELATED APPLICATIONS

This application is Continuation of U.S. application Ser. No. 15/309,845, filed Nov. 9, 2016, which is a U.S. National Phase of International Patent Application No. PCT/JP2015/063059 filed on May 1, 2015, which claims priority benefit of Japanese Patent Application No. JP 2014-102316 filed in the Japan Patent Office on May 16, 2014. Each of the above-referenced applications is hereby incorporated herein by reference in its entirety.

TECHNICAL FIELD

The present technology relates to a reception apparatus, a reception method, a transmission apparatus, and a transmission method and more particularly to a reception apparatus, a reception method, a transmission apparatus, and a transmission method, by which channel selection information can be acquired more efficiently.

BACKGROUND ART

In terrestrial digital television broadcasting, an increase in reception by not only a fixed receiver such as a television receiver but also a portable receiver such as a smartphone and a tablet terminal is assumed (e.g., see Patent Document 1).
Patent Document 1: Japanese Patent Application Laid-open No. 2012-244496

SUMMARY OF INVENTION

Problem to be Solved by the Invention

By the way, in order to receive a broadcast wave of terrestrial digital television broadcasting in a portable receiver, it is necessary to acquire channel selection information such as a frequency. However, a portable receiver that is movable is used in unspecified places. Therefore, it is not realistic to acquire channel selection information through initial scanning in each case as in the fixed receiver used in a particular place, and it is required to acquire the channel selection information more efficiently.

The present technology has been made in view of the above-mentioned circumstances to be capable of acquiring channel selection information more efficiently.

Means for Solving the Problem

A reception apparatus according to a first aspect of the present technology is a reception apparatus including: a reception unit that receives a broadcast wave of digital broadcasting using an IP (Internet Protocol) transmission system; a communication unit that receives first signaling information for acquiring broadcast content transmitted by the broadcast wave through communication with a server via a network; an acquisition unit that acquires, on the basis of the first signaling information, a physical parameter used in a physical layer in a hierarchy of a protocol of the IP transmission system; and a control unit that controls, on the basis of the physical parameter, operations of respective units that perform channel selection processing.

The acquisition unit may acquire, on the basis of pointer information included in the first signaling information, the physical parameter included in second signaling information transmitted in a second layer, the second layer being a lower layer than a first layer in the hierarchy of the protocol of the IP transmission system, the first signaling information being transmitted in the first layer.

The pointer information may be information for accessing the physical parameter in a particular service in accordance with a channel selection operation.

The pointer information may include a country code assigned to each country, a first identifier assigned to each broadcaster as a unique value, a second identifier assigned to each stream as a unique value, and a third identifier assigned to each service as a unique value.

The first signaling information may be an SDP (Session Description Protocol), and the second signaling information may be an SCD (Service Configuration Description).

The acquisition unit may acquire the physical parameter included in the first signaling information.

The physical parameter may include a center frequency, an identifier for identifying a PLP (Physical Layer Pipe), and a value of a preamble included in a frame defined in the IP transmission system.

The physical parameter may include a center frequency, a value of an L1-pre signaling constituting a preamble included in a frame defined in the IP transmission system, and a value of a target PLP (Physical Layer Pipe) of L1-post signaling constituting the preamble.

The first signaling information may be an SDP (Session Description Protocol).

The reception apparatus may be an independent apparatus or may be an internal block configuring a single apparatus.

A reception method according to the first aspect of the present technology is a reception method corresponding to the reception apparatus according to the first aspect of the present technology.

In the reception apparatus and the reception method according to the first aspect of the present technology, a broadcast wave of digital broadcasting using an IP transmission system is received; first signaling information for acquiring broadcast content transmitted by the broadcast wave is received through communication with a server via a network; on the basis of the first signaling information, a physical parameter used in a physical layer in a hierarchy of a protocol of the IP transmission system is acquired; and on the basis of the physical parameter, operations of respective units that perform channel selection processing are controlled.

A transmission apparatus according to a second aspect of the present technology includes: a generator that generates first signaling information for acquiring broadcast content transmitted by a broadcast wave of digital broadcasting using an IP (Internet Protocol) transmission system, the first signaling information including information on a physical parameter used in a physical layer in a hierarchy of a protocol of the IP transmission system; and a transmission unit that transmits the first signaling information to a receiver via a network in response to a request from the receiver.

The first signaling information may include pointer information for accessing the physical parameter included in second signaling information transmitted in a second layer, the second layer being a lower layer than a first layer in the hierarchy of the protocol of the IP transmission system, the first signaling information being transmitted in the first layer.

The pointer information may be information for accessing the physical parameter in a particular service in accordance with channel selection operation.

The pointer information may include a country code assigned to each country, a first identifier assigned to each broadcaster as a unique value, a second identifier assigned to each stream as a unique value, and a third identifier assigned to each service as a unique value.

The first signaling information may be an SDP (Session Description Protocol), and the second signaling information may be an SCD (Service Configuration Description).

The first signaling information may include the physical parameter.

The physical parameter may include a center frequency, an identifier for identifying a PLP (Physical Layer Pipe), and a value of a preamble included in a frame defined in the IP transmission system.

The physical parameter may include a center frequency, a value of L1-pre signaling constituting a preamble included in a frame defined in the IP transmission system, and a value of a target PLP (Physical Layer Pipe) of L1-post signaling constituting the preamble.

The first signaling information may be an SDP (Session Description Protocol).

The transmission apparatus may be an independent apparatus or may be an internal block configuring a single apparatus.

A transmission method according to the second aspect of the present technology is a transmission method corresponding to the transmission apparatus according to the second aspect of the present technology.

In the transmission apparatus and the transmission method according to the second aspect of the present technology, first signaling information for acquiring broadcast content transmitted by a broadcast wave of digital broadcasting using an IP (Internet Protocol) transmission system is generated, the first signaling information including information on a physical parameter used in a physical layer in a hierarchy of a protocol of the IP transmission system; and the first signaling information is transmitted to a receiver via a network in response to a request from the receiver.

Effects of the Invention

In accordance with the first aspect and the second aspect of the present technology, it is possible to acquire channel selection information more efficiently.

It should be noted that the effect described here is not necessarily limitative and may be any effect described in the present disclosure.

BRIEF DESCRIPTION OF DRAWINGS

FIG. 5 A diagram showing a data structure of an SCD.

FIG. 6 A diagram showing a data structure of an SDP.

FIG. 7 A diagram showing an attribute type of the SDP.

FIG. 9 A diagram showing another description example of the SDP shown in FIG. 3.

FIG. 12 A diagram showing a description example of the SDP shown in FIG. 10.

FIG. 13 A diagram showing a description example of pointer information of the SDP.

FIG. 16 A diagram showing a description example of the SDP shown in FIG. 14.

FIG. 17 A diagram showing a description example of the channel selection information of the SDP shown in FIG. 16.

FIG. 18 A diagram showing a description example of the channel selection information of the SDP shown in FIG. 16.

FIG. 19 A diagram showing a description example of the SDP shown in FIG. 14.

FIG. 20 A diagram showing a description example of the channel selection information of the SDP shown in FIG. 19.

FIG. 21 A diagram showing a description example of the channel selection information of the SDP shown in FIG. 19.

MODE(S) FOR CARRYING OUT THE INVENTION

Hereinafter, embodiments of the present technology will be described with reference to the drawings. Note that descriptions will be made in the following order.

1. Outline of Digital Broadcasting in IP Transmission System
2. Channel Selection Processing in Fixed Receiver
3. Channel Selection Processing in Portable Receiver
(1) First Embodiment: Method of Acquiring Channel Selection Information from SCD in accordance with Pointer Information of SDP
(2) Second Embodiment: Method of Acquiring Channel Selection Information from SDP
4. System Configuration
5. Flows of Processing Executed by Apparatuses
6. Modified Example
7. Configuration of Computer

1. Outline of Digital Broadcasting in IP Transmission System (Protocol Stack)

Figure 1:
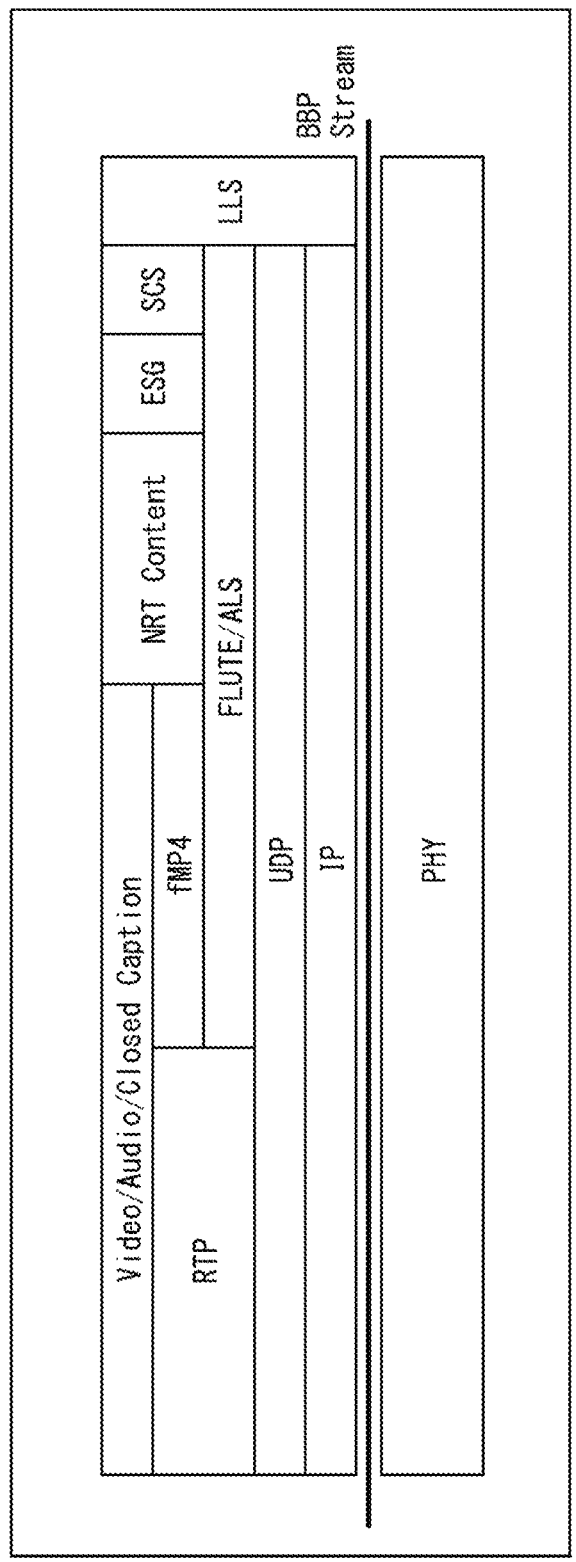
FIG. 1 A diagram showing a protocol stack of digital broadcasting in an IP transmission system.

FIG. 1 is a diagram showing a protocol stack of digital broadcasting in an IP transmission system.

As shown in FIG. 1, a lowest layer is a physical layer. The frequency band of broadcast waves assigned for a service (channel) corresponds to this. An upper layer that is adjacent to the physical layer is an IP layer sandwiching a BBP stream (Base Band Packet Stream) therebetween. The BBP stream is a stream including packets storing various types of data of the IP transmission system.

The IP layer corresponds to an IP (Internet Protocol) in the TCP/IP protocol stack. IP packets are identified by IP addresses. An upper layer adjacent to the IP layer is a UDP layer. In a further upper layer, RTP and FLUTE/ALS are shown. Thus, in the digital broadcasting in the IP transmission system, packets in which a port number of a UDP (User Datagram Protocol) is specified are transmitted and an RTP (Real time Transport Protocol) session or a FLUTE (File Delivery over Unidirectional Transport) session is established, for example. Note that herein, "FLUTE+ (plus)" being the extension of FLUTE is used in some cases. Further, FLUTE+ is in some cases called "FLUTE enhancement."

In an upper layer adjacent to the FLUTE/ALS, fMP4 (Fragmented MP4) is shown. In addition, in an upper layer adjacent to the RTP and the fMP4, video data (Video), audio data (Audio), and closed caption data (Closed Caption) are shown, for example. Thus, the RTP session is used when the video data and the audio data are transmitted as streams, and the FLUTE session is used when the video data and the audio data are transmitted as files.

Further, in an upper layer of the FLUTE/ALS, NRT content, ESG, and SCS are shown. The NRT content, ESG, and SCS are transmitted through the FLUTE session. The NRT content is content transmitted by NRT (Non-Real Time) broadcasting, stored in storage of a receiver, and then reproduced. Note that the NRT content is an example of the content and other content files may be transmitted through the FLUTE session. The ESG (Electronic Service Guide) is an electronic service guide.

The SCS (Service Channel Signaling) is signaling information in units of services and transmitted through the FLUTE session. For example, USD (User Service Description), MPD (Media Presentation Description), SDP (Session Description Protocol), and FDD (File Delivery Description) are transmitted as the SCS.

LLS (Low Layer Signaling) is low-layer signaling information and transmitted in the BBP stream. For example, service configuration information items such as SCD (Service Configuration Description) are transmitted as the LLS.

(Configuration of Broadcast Wave in IP Transmission System)

Figure 2:
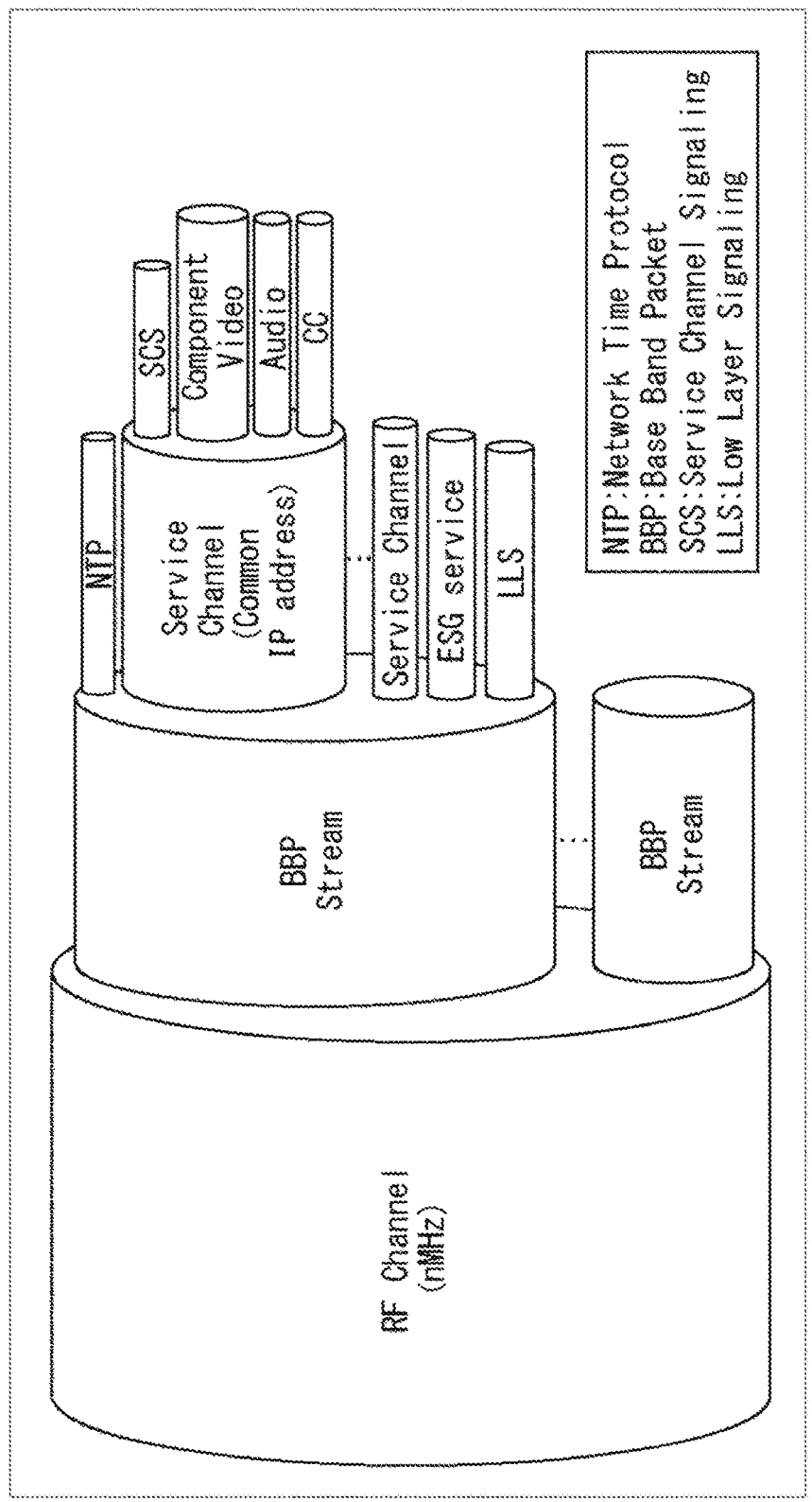
FIG. 2 A diagram showing a configuration of a broadcast wave of the digital broadcasting in the IP transmission system.

FIG. 2 is a diagram showing a configuration of a broadcast wave of the digital broadcasting in the IP transmission system.

As shown in FIG. 2, a plurality of BBP streams are transmitted in a broadcast wave (RF Channel) having a predetermined frequency band. Further, each of the BBP streams includes an NTP (Network Time Protocol), a plurality of service channels, an electronic service guide (ESG Service), and an LLS. Note that the NTP, the service channels, and the electronic service guide are transmitted according to a UDP/IP protocol while the LLS is transmitted in the BBP stream. Further, the NTP is time information and can be common to the plurality of service channels.

The service channels (hereinafter, referred to as "services") include components such as video, audio, and closed captions, which are information items configuring a program, and an SCS such as USD and SDP. A common IP address is added to the services. Using this IP address, the components, the SCS, and the like can be packaged for one or more services.

An RF channel ID (hereinafter, referred to also as "RFChannelId") is assigned to a broadcast wave (RF Channel) having a predetermined frequency band for each broadcaster, for example. Further, a BBP stream ID (hereinafter, referred to also as "BBPStreamId") is assigned to one or more BBP streams transmitted by each broadcast wave. In addition, a service ID (hereinafter, referred to also as "serviceId") is assigned to one or more services transmitted by each of the BBP streams.

Such a configuration corresponding to a combination of network ID, transport stream ID, and service ID used in the MPEG2-TS (Moving Picture Expert Group 2-Transport Stream) system (hereinafter, referred to as "triplet") is employed as the ID system of the IP transmission system. This triplet indicates a BBP stream configuration and a service configuration in a broadcasting network.

The use of this ID system can achieve compatibility with the currently widely spread MPEG2-TS system, and hence it is possible to easily perform simulcast during transition from the MPEG2-TS system to the IP transmission system, for example. It should be noted that the RF channel ID and the BBP stream ID in the ID system of the IP transmission system correspond to the network ID and the transport stream ID in the MPEG2-TS system, respectively. On the other hand, the BBP stream corresponds to PLP (Physical Layer Pipe) defined by the IP transmission system.

2. Channel Selection Processing Performed by Fixed Receiver (Channel Selection Processing)

Figure 3:
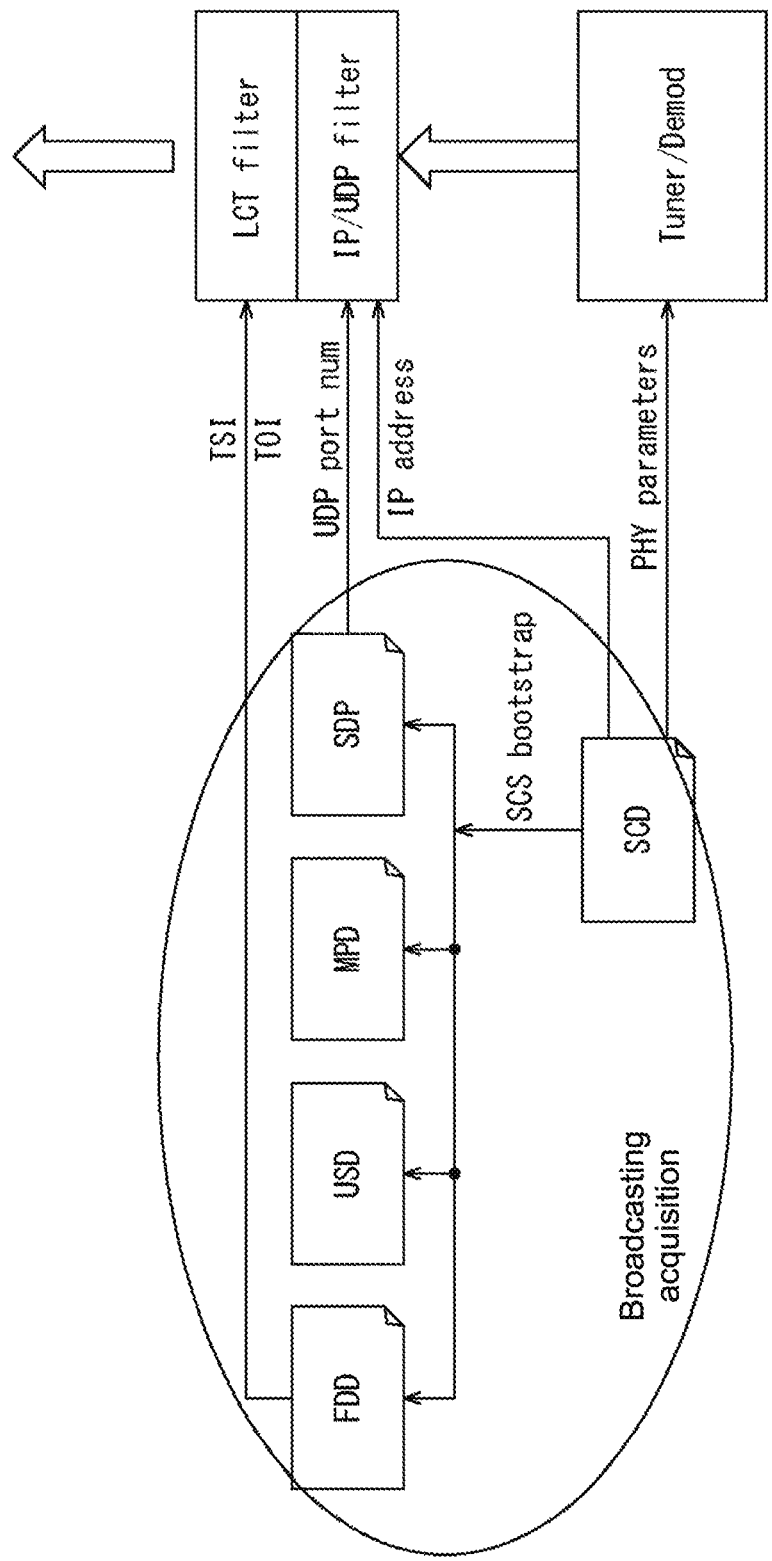
FIG. 3 A diagram explaining channel selection processing performed by a fixed receiver.

FIG. 3 is a diagram explaining channel selection processing performed by a fixed receiver.

In FIG. 3, the signaling information items in the area of an ellipse in the figure represent "broadcasting acquisition," i.e., the acquisition source thereof is broadcasting. A fixed receiver such as a television receiver placed in a house or the like acquires channel selection information such as the SCD through initial scanning processing performed at the time of installation or the like, and stores it in an NVRAM (Non Volatile RAM). Then, in the case where a channel selection operation is performed by a user, the fixed receiver reads the channel selection information (physical parameter) from the NVRAM to perform the channel selection processing (Tuner/Demod). Note that in this channel selection processing, demodulation processing using the physical parameter or the like is also performed.

The SCD (Service Configuration Description) employs the triplet used in the MPEG2-TS system. This triplet indicates the BBP stream configuration and the service configuration in the broadcasting network. The SCD further includes information on an IP address and the like serving as attribute/setting information in units of services, bootstrap information for acquiring the SCS and ESG, and the like.

Further, the physical parameter (PHY parameters) is a parameter used in the physical layer in the hierarchy of the protocol stack shown in FIG. 1, and includes channel selection information such as a frequency. Note that because the SCD includes the channel selection information serving as the physical parameter, the fixed receiver is capable of acquiring the channel selection information from the SCD even if initial scanning processing is not performed.

Further, because the SCD includes SCS bootstrap information, the fixed receiver is capable of acquiring the SCS transmitted through the FLUTE session in accordance with the SCS bootstrap information. In FIG. 3, the USD, MPD, SDP, and FDD are acquired by broadcasting as the SCD.

The USD (User Service Description) includes link information for referring to the MPD, SDP, and FDD. Note that the USD is in some cases called USBD (User Service Bundle Description). The MPD (Media Presentation Description) includes information on URLs (Uniform Resource Locators) and the like for streams (components) transmitted in units of services. Note that the MPD complies with the MPEG-DASH (Moving Picture Expert Group-Dynamic Adaptive Streaming over HTTP) standard.

The SDP (Session Description Protocol) includes a service attribute in units of services, component configuration information, a component attribute, component filter information, component location information, and the like. The FDD (File Delivery Description) includes, as index information for each TSI (Transport Session Identifier), location information (e.g., URL) and information on TOI (Transport Object Identifier) and the like. Note that the FDD may be included as an element in the USD.

In the FLUTE session, files to be transmitted or the like are managed by the TOI as one object. Further, the aggregate of a plurality of objects is managed by TSI as one session. That is, in the FLUTE session, it is possible to specify a particular file by two identification information items of the TSI and the TOI.

In FIG. 3, in the case where components such as video and audio are transmitted as streams in units of segments in the FLUTE session, the fixed receiver performs filtering processing (IP/UDP filter) using an IP address acquired from the SCD and a port number acquired from the SDP, and filtering processing (LCT filter) using the TSI and the TOI acquired from the FDD.

With this, in the fixed receiver, the segment transmitted in the FLUTE session is determined, and components such as video and audio transmitted as streams are acquired. Then, by performing a series of reception processing such as channel selection•processing and filtering processing, the fixed receiver outputs a picture and sound in the broadcast content of a service in accordance with the channel selection operation performed by the user.

(Flow of Data During Channel Selection Operation)

Figure 4:
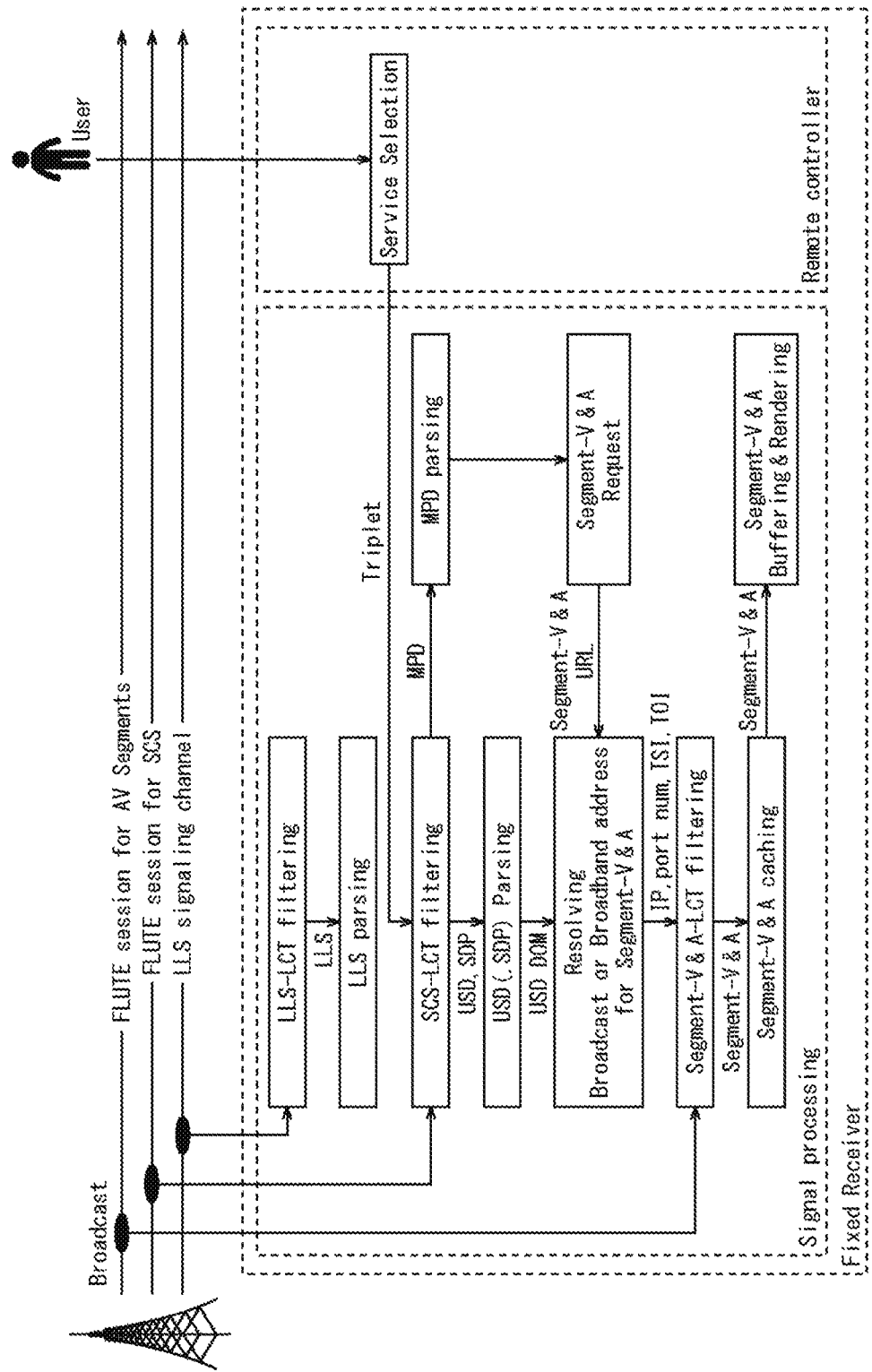
FIG. 4 A diagram showing flow of data during a channel selection operation performed by the fixed receiver.

FIG. 4 is a diagram showing flow of data acquisition during a channel selection operation performed by the fixed receiver.

In FIG. 4, a transmitter of a broadcasting station (broadcaster) transmits, through a broadcast wave of the digital broadcasting using the IP transmission system, broadcast content or signaling information for each service. Note that the broadcast content includes components such as video and audio.

Further, the above-mentioned ID system is employed in this digital broadcasting. Further, files of the components or SCS transmitted as streams in units of segments are transmitted through the FLUTE session. Further, the file of the LLS is transmitted in the BBP stream.

In FIG. 4, the area surrounded by dotted lines in the figure represents the flow of processing performed by the fixed receiver placed in each house or the like. In the fixed receiver, it is possible to perform channel selection operation of a service with a remote controller, and the content of the processing is shown in the right-hand dotted lines (in the dotted lines of "Remote controller") in the figure. On the other hand, in the left-hand dotted lines (in the dotted lines of "Signal processing") in the figure, signal processing related to the signaling information or component, which is performed by the fixed receiver, is shown.

The fixed receiver performs filtering processing of packets of the LLS as initial scanning processing, acquires the LLS, and analyze it to thereby store the channel selection information such as the SCD in the NVRAM. After that, in the case where the channel selection operation of a service (program) is performed by the user, the fixed receiver reads the channel selection information from the NVRAM and performs channel selection•processing. Note that, as described above, because the SCD includes the channel selection information serving as the physical parameter, the fixed receiver is capable of acquiring the channel selection information from the SCD even if initial scanning processing is not performed.

Further, the fixed receiver acquires the SCS transmitted in the FLUTE session in accordance with SCS bootstrap information of the SCD. As the SCS, files of the USD, MPD, SDP, and FDD are acquired herein. The fixed receiver acquires video and audio components transmitted in the FLUTE session as streams in units of segments, on the basis of the analysis results of the USD, MPD, SDP, and FDD.

Specifically, link information is described in the USD and this link information is used for acquiring the MPD, SDP, and FDD. Those signaling information items are all included in the SCS, and hence all of them can also be acquired from it.

In AdaptationSet elements of the MPD, Representation elements are provided and components transmitted as streams by broadcasting or communication are enumerated. In the Representation elements, segment URLs indicating acquisition sources of the components are enumerated other than representation IDs. In the example of the MPD of FIG. 4, video and audio components are enumerated in the Representation elements within the AdaptationSet elements. Further, in the deliveryMethod element of the USD, information for identifying a delivery mode for the components is specified.

For example, in the case where the component is transmitted only by broadcasting as shown in FIG. 4, a broadcastAppService element is provided in the deliveryMethod element and the URL of the component transmitted by broadcasting is specified in a basepattern element. By matching the segment URLs described in the MPD with the URL described in the deliveryMethod element, it is determined that the video and audio components enumerated in the MPD are being transmitted by broadcasting. Note that in the case where the components are transmitted also by communication, a unicastAppService element is provided in the deliveryMethod element of the USD in addition to the broadcastAppService element.

Further, tsi attribute, contentLocation attribute, and toi attribute are described in the FDD. In the tsi attribute, a TSI (Transport Session Identifier) that is identification information of each FLUTE session is specified. Further, in the toi attribute, a TOI (Transport Object Identifier) that is identification information of a plurality of objects transmitted in each FLUTE session is specified. In the contentLocation attribute, the URL of the file is specified. By matching the segment URLs described in the MPD with the URLs described in the FDD, the TSI and TOI for acquiring the components enumerated in the MPD are determined. In addition, by referring to the SDP, IP addresses and port numbers for acquiring those video and audio components are determined.

In this manner, the IP address, port number, TSI, and TOI for acquiring the video component and the IP address, port number, TSI, and TOI for acquiring the audio component are acquired in the fixed receiver.

Performing filtering processing using the IP addresses, port numbers, TSIs, and TOIs for the video and audio components, the fixed receiver is connected to the video and audio streams being transmitted through the FLUTE session. Then, the fixed receiver acquires segment data (media segment) and temporarily stores it in a buffer for buffering, and performs rendering. With this, at the fixed receiver, a picture and sound in the broadcast content of a service in accordance with the channel selection operation performed by the user are output.

(Data Structure of SCD)

FIG. 5 is a diagram showing a data structure of an SCD (Service Configuration Description).

The SCD is described with a markup language, for example, an XML (Extensible Markup Language). Note that, in FIG. 5, "@" is added to the attribute out of the element and the attribute. Further, the indented elements and attributes are those specified with respect to upper-level elements thereof.

As shown in FIG. 5, the Scd element is an upper-level element of majorProtocolversion attribute, minorProtocolversion attribute, RFchannelId attribute, name attribute, Tuning_RF element, and BBPStream element.

In the majorProtocolversion attribute and the minorProtocolversion attribute, protocol version information is specified. In the RFchannelId attribute, an RF channel ID of a broadcasting station in units of physical channels is specified. In the name attribute, the name of the broadcasting station in units of physical channels is specified.

In the Tuning_RF element, the channel selection information serving as the physical parameter is specified. The Tuning_RF element is an upper-level element of frequency attribute and PreambleL1Pre attribute. In the frequency attribute, a center frequency in selecting a predetermined bandwidth is specified. In the PreambleL1Pre attribute, a control parameter of a physical layer is specified.

In the BBPStream element, information relating to one or more BBP streams is specified. The BBPStream element is an upper-level element of bbpStreamId attribute, payloadType attribute, name attribute, ESGBootstrap element, ClockReferenceInformation element, Tuning_BBPS element, and Service element.

In the bbpStreamId attribute, a BBP stream ID is specified. If a plurality of BBP streams are provided, they are identified by bbpStreamId attributes. In the payloadType attribute, a payload type of the BBP stream is specified. In the name attribute, the name of the BBP stream is specified.

In the ESGBootstrap element, information on access to the ESG is specified. The ESGBootstrap element is an upper-level element of an ESGProvider element. In the ESGProvider element, information relating to the ESG is specified for each ESG provider. The ESGProvider element is an upper-level element of providerName attribute, ESGBroadcastLocation element, and ESGBroadbandLocation element.

In the providerName attribute, the name of the ESG provider is specified. If an ESG is transmitted by broadcasting, the ESGBroadcastLocation element specifies an ESG service, using RFchannelId attribute, BBPStreamId attribute, and ESGServiceId attribute (triplet). In the RFchannelId attribute, an RF channel ID of a broadcasting station that transmits the ESG service is specified. In the BBPStreamId attribute, a BBP stream ID of a BBP stream that transmits the ESG service is specified. In the ESGServiceId attribute, a service ID of the ESG service is specified.

If an ESG is transmitted by communication, the ESGBroadbandLocation element specifies a URL for accessing a file of that ESG, using an ESGurl attribute.

In the ClockReferenceInformation element, information relating to time information (e.g., NTP) is specified. The ClockReferenceInformation element is an upper-level element of sourceIPAddress attribute, destinationIPAddress attribute, portNum attribute, and clockReferenceFormat attribute.

In the sourceIPAddress attribute and the destinationIPAddress attribute, IP addresses of source and destination for transmitting the time information are specified. In the portNum attribute, a port number for transmitting the time information is specified. In the clockReferenceFormat attribute, type information of the time information is specified.

In the Tuning_BBPS element, the channel selection information for each BBP stream is specified as the physical parameter. The Tuning_BBPS element is an upper-level element of plpId attribute and PreambleL1post element. In the plpId attribute, a PLP ID (PLP (Physical Layer Pipe) identifier) for identifying the BBP stream is specified. Note that the PLP ID corresponds to the BBP stream ID. In the PreambleL1post element, a control parameter of the physical layer is specified.

In the Service element, information relating to one or more services is specified. The Service element is an upper-level element of serviceId attribute, serviceType attribute, hidden attribute, hiddenGuide attribute, shortName attribute, longName attribute, accesControl attribute, SourceOrigin element, SCS bootstrap element, and Associated Service element.

In the serviceId attribute, the service ID is specified. If a plurality of services are provided, they are identified by serviceId attributes. In the serviceType attribute, type information of the service is specified.

In the hidden attribute and the hiddenGuide attribute, whether or not the service identified by the service ID is a hidden service is specified. In the shortName attribute and the longName attribute, the name of a service identified by the service ID is specified. In the accesControl attribute, whether or not the service identified by the service ID has been encrypted is specified.

In the SourceOrigin element, information for identifying the service is specified. The SourceOrigin element is an upper-level element of country attribute, original RFchannelId attribute, bbpStreamId attribute, and serviceId attribute. In the country attribute, a country code is specified. In the originalRFchannelId attribute, an original RF channel ID is specified. The original RF channel ID is an ID for identifying the broadcasting network and the same value is used therefor also when that service is re-transmitted. In the bbpStreamId attribute, the BBP stream ID is specified. In the serviceId attribute, the service ID is specified.

In an SCS Bootstrap element, information on access to the service is specified. The SCS Bootstrap element is an upper-level element of sourceIPAddress attribute, destinationIPAddress attribute, portNum attribute, and tsi attribute. In the sourceIPAddress attribute and the destinationIPAddress attribute, IP addresses of source and destination for transmitting the service are specified. In the portNum attribute, the port number for transmitting the SCS is specified. In the tsi attribute, the TSI in the FLUTE session that transmits the SCS is specified.

In the Associated Service element, information relating to an associated slave service is specified. The Associated Service element is an upper-level element of RFchannelId attribute, bbpStreamId attribute, and serviceId attribute. In the RFchannelId attribute, an RF channel ID of the associated slave service is specified. In the bbpStreamId attribute, a BBP stream ID of the associated slave service is specified. In the serviceId attribute, a service ID of the associated slave service is specified.

In FIG. 5, regarding cardinality, when "1" is specified, only one element or attribute is necessarily specified. When "0 . . . 1" is specified, it is optional whether to specify an element or attribute. When "1 . . . n" is specified, one or more elements or attributes are specified. When "0 . . . n" is specified, it is optional whether to specify one or more elements or attributes.

(Data Structure of SDP)

FIG. 6 is a diagram showing a data structure of an SDP (Session Description Protocol). The SDP is described in a text format, for example.

As shown in FIG. 6, the SDP includes two sections of Session Description and Media Description. In the Session Description, information relating to the session is described. On the other hand, in the Media Description, it is possible to describe a plurality of media information items such as audio data and video data transmitted in the RTP session or FLUTE session.

In the Session Description, it is possible to describe protocol version (v), origin (o), session name (s), session information (i), URI (u), email address (e), phone number (p), connection data (c), (session) bandwidth (b), timing (t), repeat times (r), time zone (z), encryption keys (k), and (session) attributes (a).

In the protocol version (v), a version of the protocol is specified. As this value, "0" or a value determined in the operation of the service is specified. In RF2327, "0" is necessarily used.

In the origin (o), information on the creator of the SDP description document is specified. For example, as the origin (o), information such as a user name (username), session ID (sess-id), session version (sess-version), network type (nettype), address type (addrtype), and unicast address (unicastaddress) is specified.

In the session name (s), a name of a session is specified. In the session information (i), information relating to the session is specified. In the URI (u), a URI (Uniform Resource Identifier) that is capable of acquiring added information relating to the session is specified.

In the email address (e), a contact e-mail address of a chief administrator of the session is specified. In the phone number (p), a contact telephone number of the chief administrator of the session is specified. In the connection data (c), information on the network address used in the session is specified. In the (session) bandwidth (b), a bandwidth of the medium used in the session is specified.

In the timing (t), valid start time and finish time of the session are specified. In the repeat times (r), a repeating period or the like in the case where the session becomes valid periodically and repeatedly is specified. Note that the timing (t) and the repeat times (r) configures Time Description.

In the time zones (z), an offset in the case where switching of summer time and winter time or the like is necessary is specified, in the case where repeat is specified in the repeat times (r) being a time descriptor. In the encryption keys (k), an encryption key used in the session or information thereon is specified. In the (session) attributes (a), various pieces of information relating to the session are specified.

In the Media Description, it is possible to describe media announcements (m), media information (i), connection data (c), (media) bandwidth (b), encryption keys (k), and (media) attributes.

In the media announcements (m), information such as media type (media), port number (port), protocol (proto), and format (fmt) is specified. In the media information (i), information relating to the media is specified. In the connection data (c), information on a network address used in the media is specified.

In the (media) bandwidth (b), a bandwidth used in the media stream is specified. In the encryption keys (k), an encryption key used in the media or information thereon is specified. In the (media) attributes, various attributes relating to the media are specified.

(Attribute Type of SDP)

FIG. 7 is a diagram showing an attribute type (Attributes) of the SDP.

The attribute type specified by "a=" represents an attribute relating to the entire session in the case where it is included in the Session Description, and an attribute relating to the media in the case where it is included in the Media Description. Note that in the case where the function of the SDP is extended, it is possible to enhance the session description capabilities of the SDP by extending the attribute part of "a=."

For example, as the attribute type, ptime, fmtp, sendrecv, recvonly, sendonly, inactive, rtpmap, and representation-id are defined.

The ptime represents the length of the medium included in one packet, and the data amount in the packet is specified as the value. The fmtp represents a format used in the medium and a particular parameter necessary for the format, and a format and a parameter are specified as the value.

The sendrecv represents that the medium is transmitted/received bidirectionally. The recvonly represents that the medium is received only. The sendonly represents that the medium is transmitted only. The inactive represents that the medium is not transmitted bidirectionally. For example, it is used in the case where the transmission/reception of the medium is suspended in the process of session or in the case where a port number, codec, or the like is ensured before the start of the session.

The rtpmap represents mapping of a payload and a coding type, and a payload and a coding type are specified as the value. The representation-id represents a representation ID, and a representation ID is specified as the value. With the representation ID, the SDP is capable of associating a component with another component in the other signaling information items of the SCS (e.g., USD, MPD, and FDD).

(Description Example of SDP)

Figure 8:
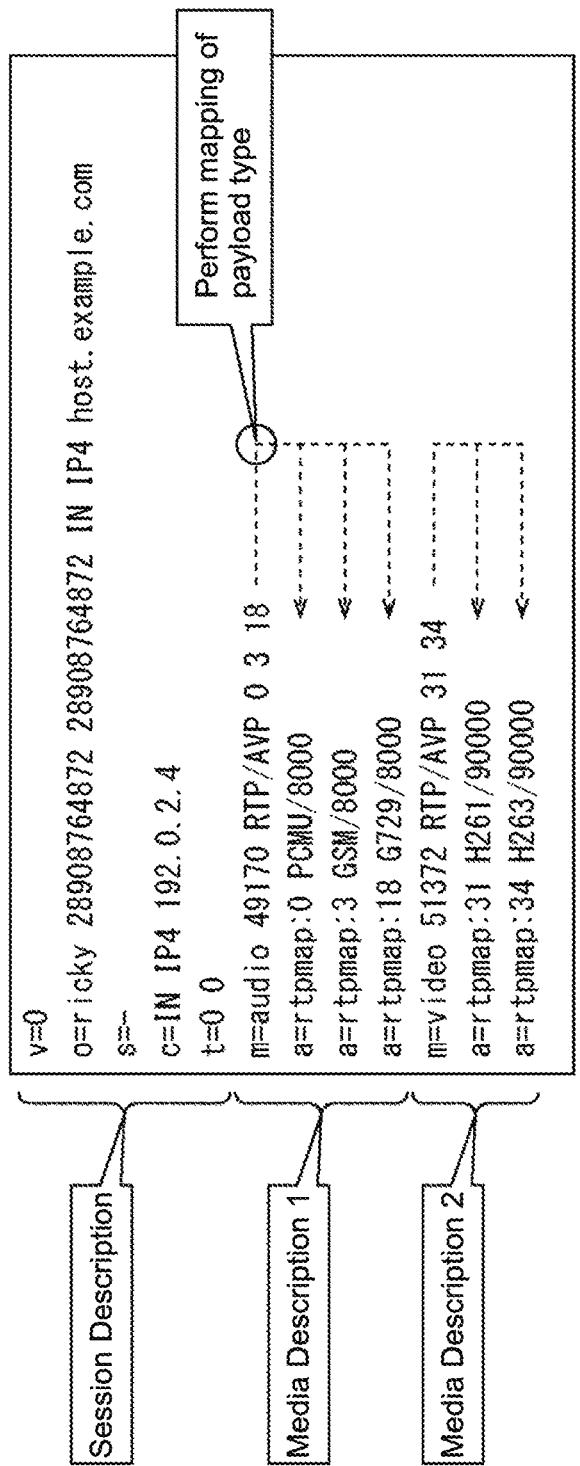
FIG. 8 A diagram showing a description example of the SDP shown in FIG. 3.

FIG. 8 is a diagram showing a description example of the SDP shown in FIG. 3.

In this description example, in the Session Description, "v" that represents a version of a protocol, "o" that represents instance creator information, "c" that represents connection data, and "t" that represents valid time of the session are described.

Specifically, in this description example, "0" is specified as the version of the protocol. Further, as the instance creator information, a user name being "ricky," SDP instance ID being "28908764872," type of transmission (host) being "IN" (Internet), type of an IP address being "IP4" (IPv4), and IP address (URL) being "host.example.com" are specified.

Further, as the information on the network address used in a particular session, a type of a network being "IN" (Internet), type of an IP address being "IP4" (IPv4), and an IP address being "192.0.2.4" are specified. Furthermore, as the valid time of the session, "0 0" is specified.

Further, in this description example, media information relating to audio is described in a Media Description 1 and media information relating to video is described in a Media Description 2 in the case where audio and video components are transmitted as streams transmitted in a particular session.

As the value of the media information, a media type, port number for transmitting a medium, protocol for transmitting a medium, format, and the like are specified. For example, as the media type, video or audio is specified. Further, as the protocol for transmitting a media, "RTP/AVP," "FLUTE/UDP," or the like is specified. Further, as the format, added information is described for each protocol if it is necessary. Further, the line beginning with "a=" represents the attribute of the corresponding medium.

Specifically, in this description example, the line of "m=audio" in the Media Description 1 describes that the port number of audio data transmitted in the RTP session is "49170." Further, by the three lines of "a=rtpmap" subsequent thereto, the payload type and the coding type are mapped. That is, the audio data is coded by any one of PCMU, GSM (registered trademark), and G729. Further, in the audio data, the time scale of the RTP time stamp is 8000.

Further, the line of "m=video" in the Media Description 2 represents that the port number of video data transmitted in the RTP session is 51372. By the two lines of "a=rtpmap" subsequent thereto, the payload type and the coding type are mapped. That is, the video data is coded by H.261 or H.263. Further, in the video data, the time scale of the RTP time stamp is 90000.

(Another Description Example of SDP)

In the description example shown in FIG. 8, a case where video and audio components are transmitted in the RTP session has been shown. However, these components may be transmitted by the FLUTE session. In this case, as a protocol for transmitting a medium, "FLUTE/UDP" is specified instead of "RTP/AVP."

FIG. 9 is a diagram showing another description example of the SDP shown in FIG. 3.

In FIG. 9, the line of "m=application" in the Media Description represents that the port number of the FLUTE session for transmitting the video and audio components is "67890."

Further, "a=flute-tsi:3" represents that the TSI of the FLUTE session is "3." Further, "a=representation-id" represents that the representation ID of the video and audio components transmitted in the FLUTE session is specified. In this description example of the SDP, as the representation ID, "23" is specified in the video component and "45" is specified in the audio component.

As described above, in the fixed receiver placed in each house or the like, the channel selection information is acquired and stored at the time of initial scanning processing or the like, and channel selection processing using the channel selection information is performed in the case where a channel selection operation is performed by a user. On the other hand, because the portable receiver such as a smartphone and a tablet terminal is used in unspecified places, it is not realistic to acquire channel selection information through initial scanning in each case as in the fixed receiver used in a particular place.

In view of the above, the portable receiver to which the present technology is applied acquires a service list and signaling information depending on location information acquired by using a GPS (Global Positioning System) function from a dedicated server provided in the Internet to perform channel selection•processing. Hereinafter, the channel selection processing performed by the portable receiver to which the present technology is applied will be described.

3. Channel Selection Processing Performed by Portable Receiver (1) First Embodiment (Channel Selection•Processing)

Figure 10:
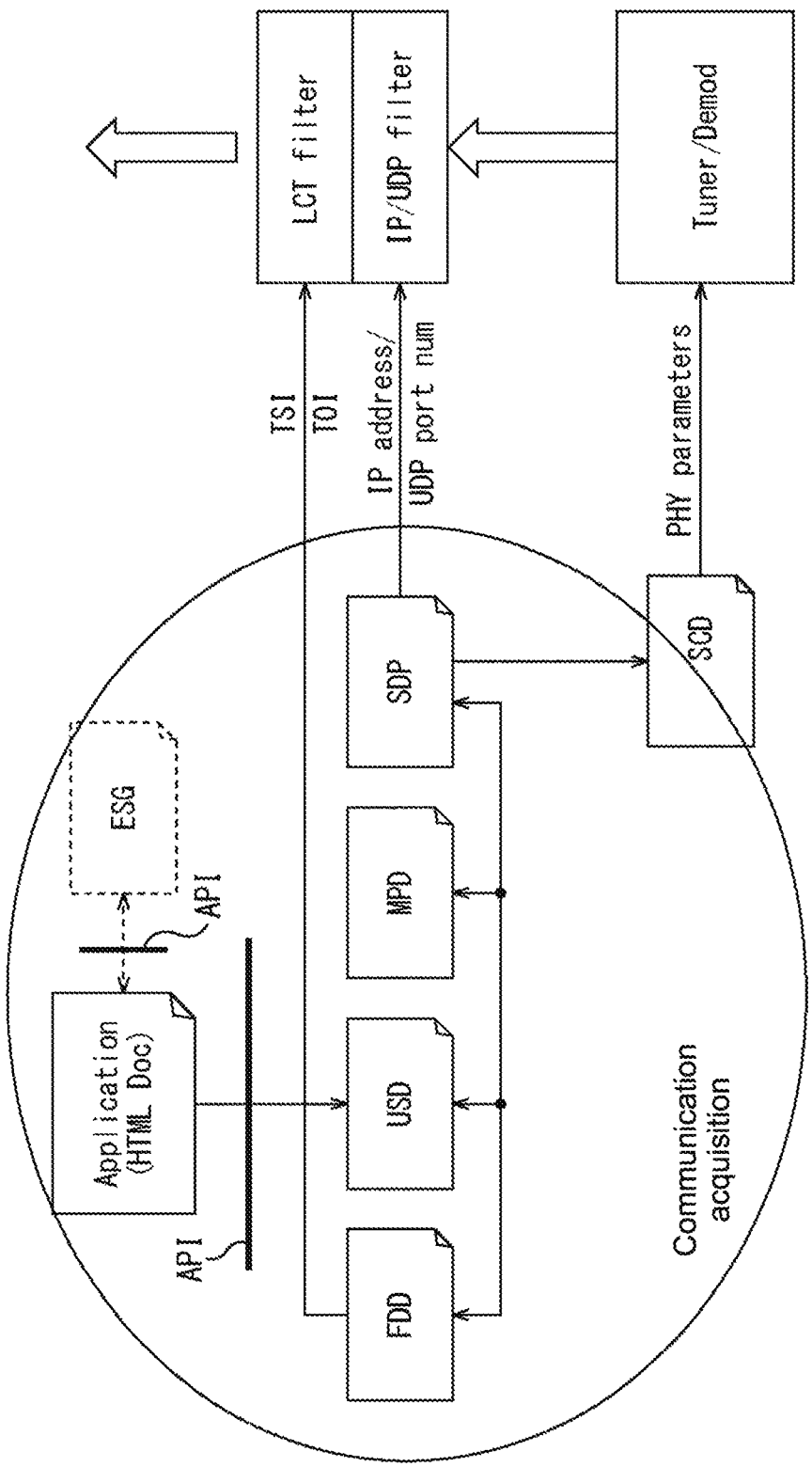
FIG. 10 A diagram explaining the channel selection processing performed by a portable receiver according to a first embodiment.

FIG. 10 is a diagram explaining the channel selection processing performed by a portable receiver according to a first embodiment.

In FIG. 10, the signaling information items in the area of an ellipse in the figure represent "communication acquisition," i.e., the acquisition source thereof is communication. On the other hand, the signaling information items outside the area of the ellipse in the figure represents "broadcasting acquisition". Therefore, the SCD may be acquired not only by communication as well as other signaling information items but also by broadcasting in the case where the portable receiver has already performed initial scanning processing or channel selection•processing, for example.

In FIG. 10, in the portable receiver, an application capable of selecting a service (program) is being executed. For example, the portable receiver acquires location information with a GPS function and transmits it to a dedicated server. Thus, the application is capable of presenting a list of services (programs) that can be used depending on the current position. Note that the application includes an HTML (HyperText Markup Language) file, for example. Further, the application is capable of cooperating with ESG (Electronic Service Guide) by an API (Application Programming Interface).

In the case where a desired service is selected by a user who operates the application, the portable receiver performs a function for channel selection that is provided as the API, and accesses the signaling server via the Internet in accordance with the URL (Uniform Resource Locator) specified as the argument thereof to acquire signaling information.

In FIG. 10, as the signaling information items, the SCS such as USD, MPD, SDP, and FDD is acquired by communication. Note that files of the USD, MPD, SDP, and FDD acquired by communication can be treated as one file in a ZIP file format. Further, the file of the SCD may be acquired by communication with the SCS by including it in a ZIP file, and has already been stored in the NVRAM in the case where it is acquired by broadcasting in initial scanning processing or the like.

In the SDP, pointer information for accessing the channel selection information (physical parameter) included in the SCD is described. The portable receiver is capable of acquiring the channel selection information (physical parameter) by accessing the SCD in accordance with the pointer information of the SDP. Accordingly, in the portable receiver, the channel selection information (e.g., frequency) serving as the physical parameter (PHY parameters) is used to perform channel selection processing (Tuner/Demod).

In FIG. 10, in the case where components such as video and audio are transmitted as streams in units of segments in the FLUTE session, the portable receiver performs filtering processing (IP/UDP filter) using an IP address and port number acquired from the SDP, and filtering processing (LCT filter) using the TSI and TOI acquired from the FDD.

Accordingly, in the portable receiver, the segment transmitted in the FLUTE session is determined, and components transmitted as streams such as video and audio are acquired. Then, by performing a series of reception processing such as channel selection•processing and filtering processing, the fixed receiver outputs a picture and sound in the broadcast content of a service in accordance with the channel selection operation performed by the user.

As described above, in the channel selection processing performed by the portable receiver according to the first embodiment, the channel selection information (physical parameter) is acquired by accessing the SCD being acquired by communication or broadcasting in accordance with the pointer information of the SDP acquired by communication, and channel selection processing using the channel selection information (e.g., frequency) is performed.

(Flow of Data During Channel Selection Operation)

Figure 11:
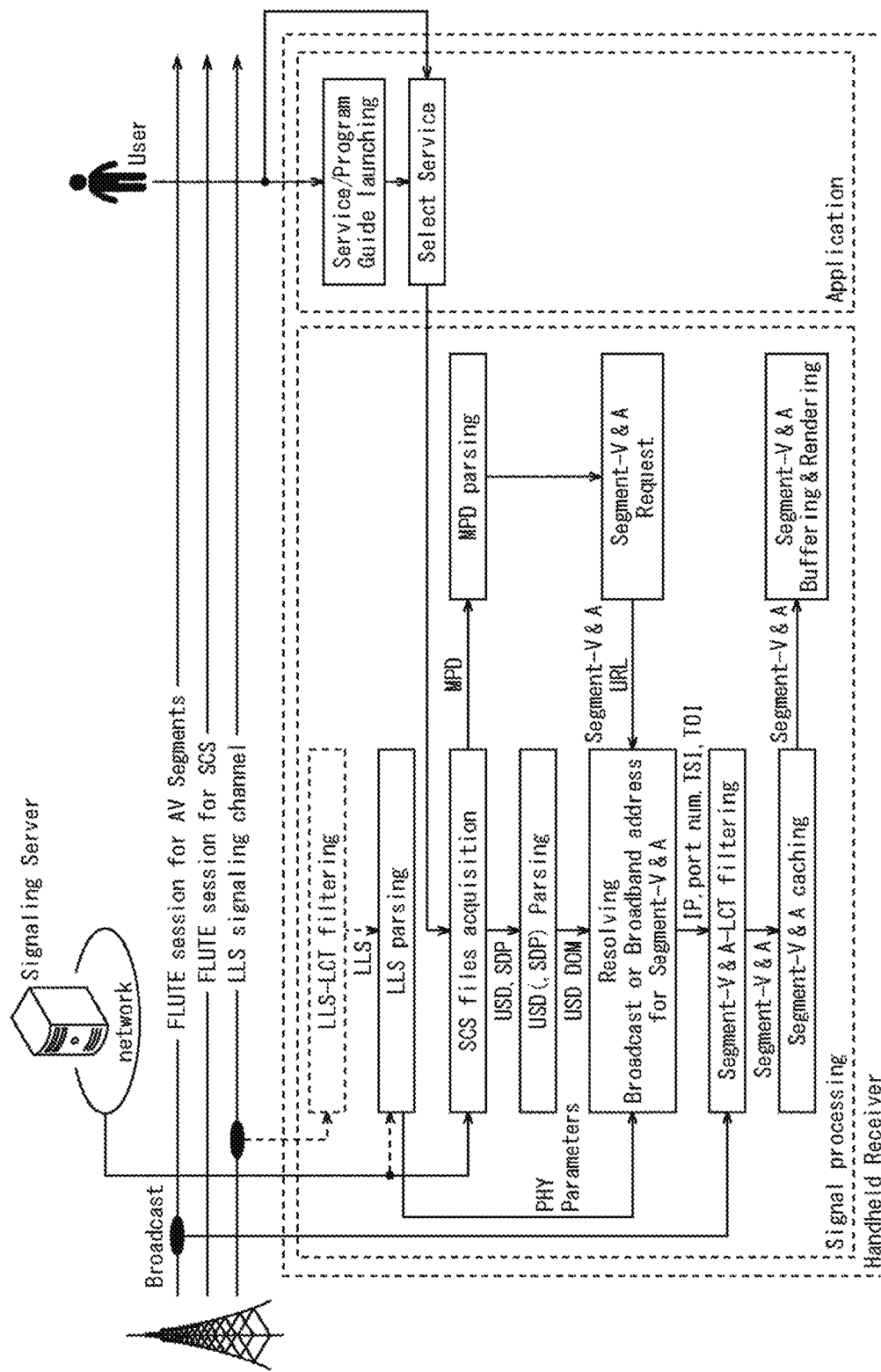
FIG. 11 A diagram showing flow of data during the channel selection operation performed by the portable receiver according to the first embodiment.

FIG. 11 is a diagram showing flow of data during the channel selection operation performed by the portable receiver according to the first embodiment.

In FIG. 11, the transmitter of a broadcasting station transmits broadcast content or signaling information for each service by a broadcast wave of digital broadcasting using the IP transmission system. Note that the broadcast content includes components such as video and audio. The signaling server delivers signaling information via the Internet.

In the digital broadcasting, the above-mentioned ID system is employed. Further, files of components or the SCS transmitted as streams in units of segments are transmitted in the FLUTE session. On the other hand, the file of the LLS is transmitted in the BBP stream.

In FIG. 11, the area surrounded by dotted lines in the figure represents the flow of processing performed by the portable receiver (Handheld Receiver). In the portable receiver, an application that is capable of selecting an available service (program) is being executed, and the content of the processing is shown in the right-hand dotted lines (in the dotted lines of "Application") in the figure. On the other hand, in the left-hand dotted lines (in the dotted lines of "Signal processing") in the figure, signal processing relating to signaling information or a component performed by the portable receiver is shown. For example, the portable receiver acquires the SCD transmitted in the BBP stream and stores it in the NVRAM in the case where initial scanning processing has been performed.

The portable receiver accesses the signaling server via the Internet to acquire the SCS in accordance with the URL in the case where a desired service is selected by the user who operates the application. Herein, files of the USD, MPD, SDP, and FDD are acquired from a ZIP file. Note that in the case where the ZIP file includes the file of the SCD, it is possible to acquire the SCD therefrom. In this case, it is not necessary to acquire the SCD transmitted in the BBP stream. That is, in the portable receiver, the SCD has been acquired by broadcasting or communication at this point.

The portable receiver access the SCD, acquires the channel selection information (physical parameter), and performs the channel selection processing, in accordance with the pointer information of the SDP. Further, the portable receiver acquires video and audio components transmitted in the FLUTE session as streams in units of segments, based on the analysis results of the USD, MPD, SDP, and FDD.

Specifically, link information is described in the USD and this link information is used for acquiring the MPD, SDP, and FDD. However, in the case where a ZIP file is used, all of them are acquired from it.

In the AdaptationSet element of the MPD, a Representation element is provided, and components transmitted as streams by broadcasting or communication are enumerated. Further, in the Representation element, segment URLs that represent the acquisition source of a component are enumerated in addition to the representation ID. In FIG. 11, in the MPD, video and audio components are enumerated in the Representation element in the AdaptationSet element. On the other hand, in the deliveryMethod element of the USD, information for identifying the delivery form of components is specified.

For example, in the case where a component is transmitted only by broadcasting as shown in FIG. 11, a broadcastAppService element is provided in the deliveryMethod element, and a URL of the component transmitted by broadcasting is specified in the basepattern element. Then, by matching the segment URL described in the MPD with the URL described in the deliveryMethod element, it is determined that video and audio components enumerated in the MPD are transmitted by broadcasting. Note that in the case where the component is transmitted also by communication, a unicastAppService element is provided in the deliveryMethod element of the USD in addition to the broadcastAppService element.

In the FDD, a tsi attribute, a contentLocation attribute, and a toi attribute are described. In the tsi attribute, the TSI being identification information of each FLUTE session is specified. Further, in the toi attribute, the TOI being identification information of a plurality of objects transmitted for each FLUTE session is specified. In the contentLocation attribute, a URL of the file is specified. Then, by matching the segment URL described in the MPD with the URL described in the FDD, the TSI and the TOI for acquiring components enumerated in the MPD are determined. Further, by referring to the SDP, an IP address and a port number for acquiring the video and audio components are determined.

In this manner, in the portable receiver, the IP address, port number, TSI, and TOI for acquiring the video component, and the IP address, port number, TSI, and TOI for acquiring the audio component are acquired.

The portable receiver performs filtering processing using the IP address, port number, TSI, and TOI of the video and audio components to be connected to streams of video and audio being transmitted in the FLUTE session. Then, the portable receiver acquires segment data (media segment), temporarily stores it in a buffer for buffering, and performs rendering. Accordingly, the portable receiver outputs a picture and sound in the broadcast content of a service in accordance with the channel selection operation performed by the user.

Note that in FIG. 11, the file of the SCS is transmitted in the FLUTE session by the transmitter. However, the portable receiver does not acquire the file of the SCS therefrom, and acquires it from the signaling server via the Internet.

(Description Example of SDP)

FIG. 12 is a diagram showing a description example of the SDP shown in FIG. 10.

In FIG. 12, the line of "a=atsc-serviceidentifier" is added in the Session Description as compared with the SDP shown in FIG. 9. By this line of "a=atsc-serviceidentifier," the pointer information for accessing the channel selection information (physical parameter) included in the SCD is specified. In the description example shown in FIG. 12, "US:13:1:183" is specified as the pointer information.

As shown in FIG. 13, values separated by colon in the pointer information represent a double-digit country code, RF channel ID, BBP stream ID, and service ID in the order from left. Therefore, in the description example shown in FIG. 12, because the country code being "US," the RF channel ID being "13," the BBP stream ID being "1," and the service ID being "183" are specified as the pointer information, the channel selection information (physical parameter) determined by the IDs and the code are acquired from the SCD.

Specifically, in the SCD (FIG. 5), a center frequency specified by the frequency attribute of the Tuning_RF element or a control parameter in a physical layer specified by the PreambleL1Pre attribute are determined and acquired, for example, as the channel selection information (physical parameter) of the service in accordance with the channel selection operation performed by the user, by the triplet specified by the pointer information of the SDP. Alternatively, a PLP ID specified by the plpId attribute of the Tuning_BBPS element of the BBPStream element or a control parameter in a physical layer specified by the PreambleL1post element are determined and acquired, for example.

Returning to the description of FIG. 12, the content of the Media Description is the same as that of the SDP shown in FIG. 9, and represents that the port number of the FLUTE session for transmitting the video and audio components is "67890" and the TSI of the FLUTE session is "3." Further, the representation ID of the video and audio is specified.

In the above, in the first embodiment, by describing the pointer information for accessing the channel selection information (physical parameter) included in the SCD in the SDP, the channel selection information (physical parameter) is acquired from the SCD to perform channel selection processing in accordance with the pointer information, in the case where the channel selection operation is performed by the user. Accordingly, also in the portable receiver used in an arbitrary place, it is possible to acquire the channel selection information efficiently. Therefore, it is possible to easily select a desired service from services being broadcasted in that place, and to view and listen to it.

(2) Second Embodiment (Channel Selection•Processing)

Figure 14:
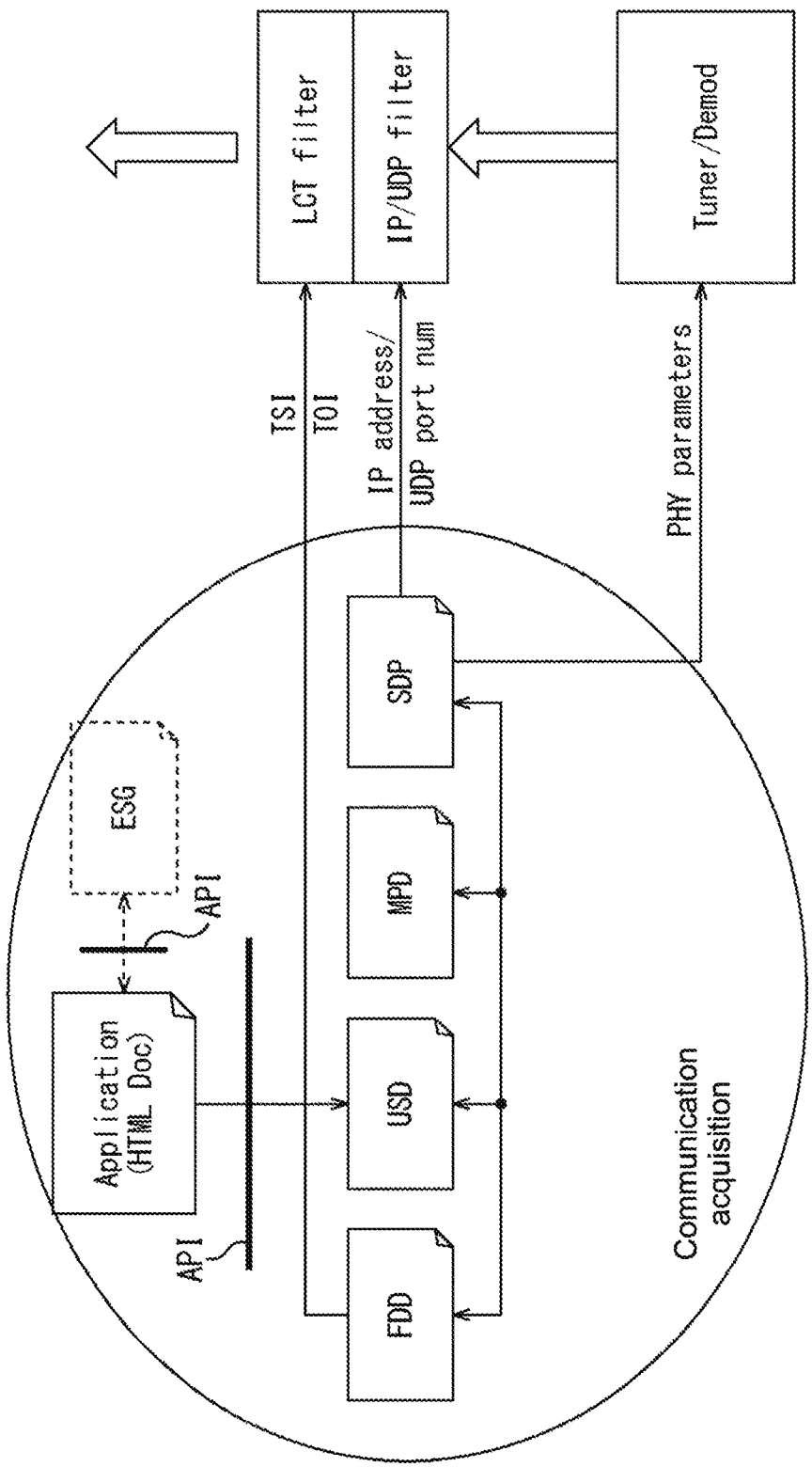
FIG. 14 A diagram explaining the channel selection processing performed by a portable receiver according to a second embodiment.

FIG. 14 is a diagram explaining the channel selection processing performed by a portable receiver according to a second embodiment.

In FIG. 14, the signaling information items in the area of an ellipse in the figure represent "communication acquisition," i.e., the acquisition source thereof is communication, as in the case of FIG. 10.

Further, in FIG. 14, in the portable receiver, an application that is capable of selecting a service (program) is being executed. Herein, for example, the portable receiver acquires location information with a GPS function to transmit it to a dedicated server. Thus, the application is capable of presenting a list of services (programs) that can be used depending on the current position. Note that the application includes an HTML file, for example. Further, the application is capable of cooperating with ESG by an API.

In the case where a desired service is selected by a user who operates the application, the portable receiver performs a function for channel selection that is provided as the API, and accesses the signaling server via the Internet in accordance with the URL specified as the argument thereof to acquire signaling information.

In FIG. 14, as the signaling information items, the SCS such as USD, MPD, SDP, and FDD is acquired by communication. Note that files of the USD, MPD, SDP, and FDD acquired by communication can be treated as one file in a ZIP file format.

In the SDP, the channel selection information (physical parameter) is directly described. That is, the channel selection information is acquired not from the SCD but from the SDP in this case. Therefore, it is not necessary to acquire the LLS (SCD), and the channel selection information is acquired with only the SCS. In the portable receiver, the channel selection information (e.g., frequency) serving as the physical parameter (PHY parameters) is used to perform channel selection•processing (Tuner/Demod).

In FIG. 14, in the case where components such as video and audio are transmitted as streams in units of segments, in the FLUTE session, the portable receiver performs filtering processing (IP/UDP filter) using an IP address and a port number acquired from the SDP and filtering processing (LCT filter) using the TSI and the TOI acquired from the FDD.

Accordingly, in the portable receiver, the segment transmitted in the FLUTE session is determined, and components transmitted as streams such as video and audio are acquired. Then, by performing a series of reception processing such as channel selection•processing and filtering processing, the portable receiver outputs a picture and sound in the broadcast content of a service in accordance with the channel selection operation performed by the user.

As described above, in the channel selection processing performed by the portable receiver according to the second embodiment, the channel selection information (physical parameter) is acquired from the SDP acquired by communication, and the channel selection information (e.g., frequency) is used to perform channel selection•processing. Specifically, the second embodiment is different from the first embodiment in that the channel selection•processing is performed without acquiring the SCD.

(Flow of Data During Channel Selection Operation)

Figure 15:
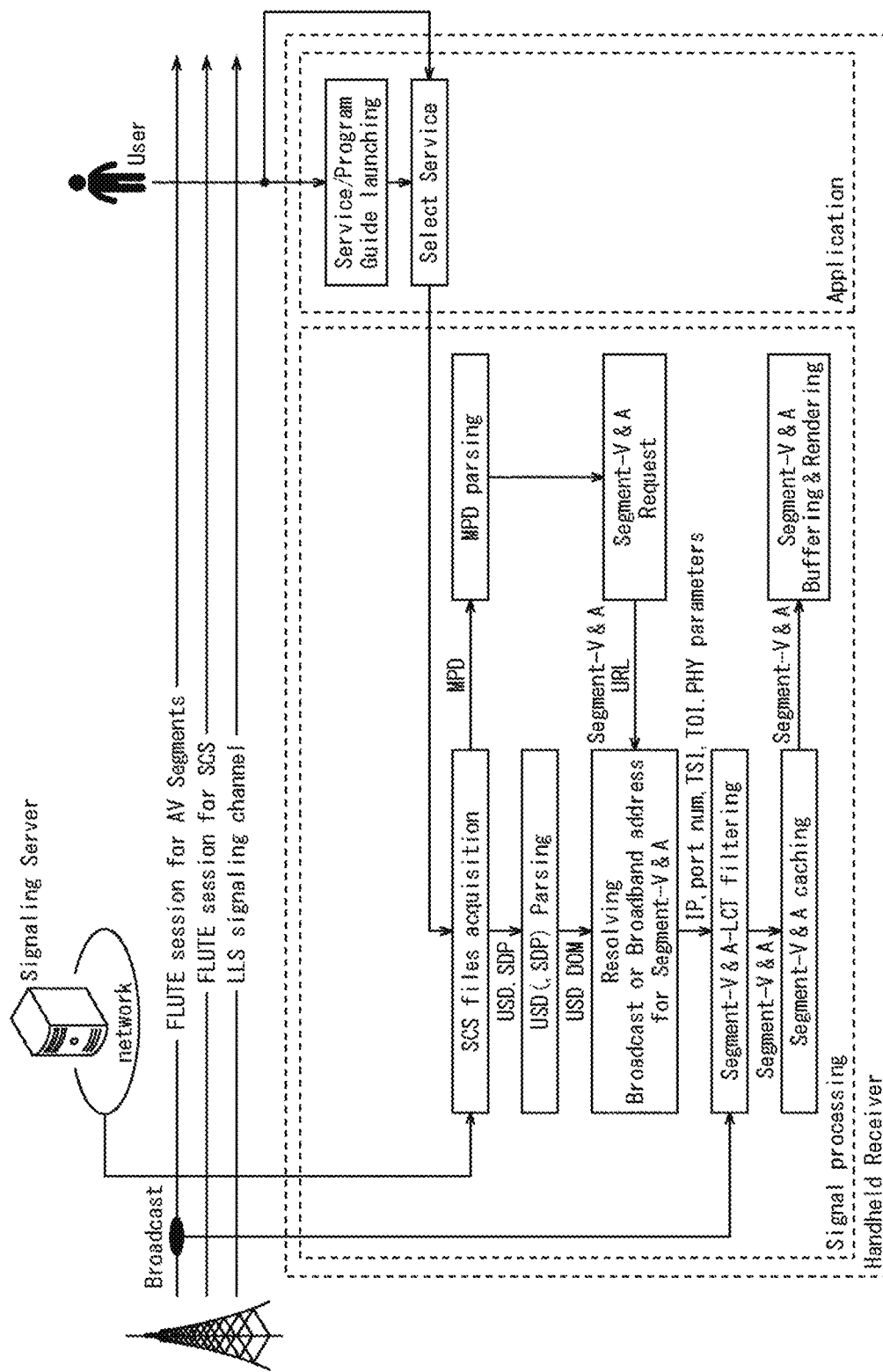
FIG. 15 A diagram showing flow of data during the channel selection•operation performed by the portable receiver according to the second embodiment.

FIG. 15 is a diagram showing flow of data during the channel selection•operation performed by the portable receiver according to the second embodiment.

In FIG. 15, a transmitter of a broadcasting station transmits, through a broadcast wave of the digital broadcasting using the IP transmission system, broadcast content or signaling information for each service, similarly to FIG. 11. Note that the broadcast content includes components such as video and audio. The signaling server delivers signaling information via the Internet.

In the digital broadcasting, the above-mentioned ID system is employed. Further, files of components or the SCS transmitted as streams in units of segments are transmitted in the FLUTE session. On the other hand, the file of the LLS is transmitted in the BBP stream.

Further, in FIG. 15, the area surrounded by dotted lines in the figure represents the flow of processing performed by the portable receiver (Handheld Receiver), similarly to FIG. 11. Further, the content of processing performed by the application is shown in dotted lines of "Application" in the area, and the content of signal processing is shown in dotted lines of "Signal processing."

The portable receiver accesses the signaling server via the Internet to acquire the SCS in accordance with the URL in the case where a desired service is selected by the user who operates the application. Herein, files of the USD, MPD, SDP, and FDD are acquired from a ZIP file.

The portable receiver acquires the channel selection information (physical parameter) described in the SDP, and performs the channel selection processing. Further, the portable receiver acquires video and audio components transmitted in the FLUTE session as streams in units of segments, based on the analysis results of the USD, MPD, SDP, and FDD.

Specifically, link information is described in the USD and this link information is used for acquiring the MPD, SDP, and FDD. However, in the case where a ZIP file is used, all of them are acquired from it.

In the AdaptationSet element of the MPD, a Representation element is provided, and components transmitted as streams by broadcasting or communication are enumerated. Further, in the Representation element, segment URLs that represent the acquisition source of a component are enumerated in addition to the representation ID. In FIG. 15, in the MPD, video and audio components are enumerated in the Representation element in the AdaptationSet element. On the other hand, in the deliveryMethod element of the USD, information for identifying the delivery form of components is specified.

For example, in the case where a component is transmitted only by broadcasting as shown in FIG. 15, a broadcastAppService element is provided in the deliveryMethod element, and a URL of the component transmitted by broadcasting is specified in the basepattern element. Then, by matching the segment URL described in the MPD with the URL described in the deliveryMethod element, it is determined that video and audio components enumerated in the MPD are transmitted by broadcasting.

In the FDD, a tsi attribute, a contentLocation attribute, and a toi attribute are described. In the tsi attribute, the TSI being identification information of each FLUTE session is specified. Further, in the toi attribute, the TOI being identification information of a plurality of objects transmitted for each FLUTE session is specified. In the contentLocation attribute, a URL of the file is specified. Then, by matching the segment URL described in the MPD with the URL described in the FDD, the TSI and the TOI for acquiring components enumerated in the MPD are determined. Further, by referring to the SDP, an IP address and a port number for acquiring the video and audio components are determined.

In this manner, in the portable receiver, the IP address, port number, TSI, and TOI for acquiring the video component, and the IP address, port number, TSI, and TOI for acquiring the audio component are acquired.

The portable receiver performs filtering processing using the IP address, port number, TSI, and TOI of the video and audio components to be connected to streams of video and audio being transmitted in the FLUTE session. Then, the portable receiver acquires segment data (media segment), temporarily stores it in a buffer for buffering, and performs rendering. Accordingly, the portable receiver outputs a picture and sound in the broadcast content of a service in accordance with the channel selection operation performed by the user.

Note that in FIG. 15, the file of the SCS is transmitted in the FLUTE session by the transmitter. However, the portable receiver does not acquire the file of the SCS therefrom, and acquires it from the signaling server via the Internet. Further, the transmitter transmits the file of the LLS in the BBP stream, but the portable receiver does not use this.

(Description Example 1 of SDP)

FIG. 16 is a diagram showing a description example of the SDP shown in FIG. 14.

In FIG. 16, the lines of "a=frequency," "a=plpId," and "a=preamble" are added in the Session Description as compared with the SDP shown in FIG. 9. By the three lines, the channel selection information serving as the physical parameter is specified.

Herein, as shown in FIG. 17, "a=frequency" represents a center frequency. Further, "a=plpId" represents a PLP ID (PLP identifier) that is capable of identifying the BBP stream, and "a=preamble" represents a preamble value serving as a control parameter including information necessary for processing such as decoding. Therefore, in the description example of FIG. 16, the center frequency being "473142857 Hz," the PLP ID being "2," and the preamble value being "XXXXX . . . XX" (X is a numerical value) is specified as the channel selection information (physical parameter).

Herein, the frame defined in the IP transmission system includes a preamble and data symbols. Further, the preamble includes the L1-pre signaling and the L1-post signaling. The L1-pre signaling includes information for receiving and decoding the L1-post signaling. Further, the L1-post signaling includes a control parameter necessary for accessing (layer pipes of) a physical layer.

In FIG. 16, as the preamble value, a plurality L1-post signaling values are specified, and it is possible to identify the target BBP stream with the PLP ID and to acquire a control parameter. Specifically, by using these three physical parameters as the channel selection information, it is possible to perform channel selection processing for selecting a service on which channel selection operation is performed by the user.

Note that it may be possible to define "a=atsc_physical_tuning" as shown in FIG. 18 and to couple the center frequency, PLP ID, and each value of the preamble value together with colons to specify it, instead of individually specify the center frequency, PLP ID, and each value of the preamble value.

Returning to the description of FIG. 16, the content of the Media Description is the same as the SDP shown in FIG. 9, and represents that the port number of the FLUTE session for transmitting video and audio components is "67890," and the TSI of the FLUTE session is "3." Further, the representation ID of video and audio is specified.

(Description Example 2 of SDP)

FIG. 19 is a diagram showing another description example of the SDP shown in FIG. 14.

In FIG. 19, the lines of "a=frequency," "a=l1-pre," and "a=l1-post" are added in the Session Description as compared with the SDP shown in FIG. 9. By the three lines, the channel selection information serving as the physical parameter (PHY parameters) is specified.

Herein, as shown in FIG. 20, "a=frequency" represents a center frequency. Further, "a=l1-pre" represents a L1-pre signaling value serving as a preamble, and "a=l1-post" represents a value of a target PLP of the L1-post signaling serving as a preamble. Therefore, in the description example of FIG. 19, the center frequency being "473142857 Hz," the L1-pre signaling value being "xxxxx . . . xx" (x is a numerical value), and the value of the target PLP of the L1-post signaling being "yyyyyy . . . yy" (y is a numerical value) are specified as the channel selection information (physical parameter).

As described above, the preamble includes the L1-pre signaling and the L1-post signaling. However, in FIG. 19, by specifying the value of the target PLP of the L1-post signaling instead of identifying the target BBP stream by the PLP ID, the target BBP stream is identified to acquire a control parameter. That is, by using these three physical parameters as the channel selection information, it is possible to perform channel selection processing for selecting a service on which channel selection operation is performed by the user.

Note that it may be possible to define "a=atsc_physical_tuning" as shown in FIG. 21 and to couple the center frequency, the L1-pre signaling value, and the value of the target PLP of the L1-post signaling together with colons to specify it, instead of individually specify the center frequency, the L1-pre signaling value, and the value of the target PLP of the L1-post signaling value.

Returning to the description of FIG. 19, the content of the Media Description is the same as the SDP shown in FIG. 9, and represents that the port number of the FLUTE session for transmitting video and audio components is "67890," and the TSI of the FLUTE session is "3." Further, the representation ID of video and audio is specified.

As described above, in the second embodiment, by directly describing the channel selection information (physical parameter) in the SDP, the channel selection information (physical parameter) is acquired to perform channel selection•processing in the case where the channel selection operation of a service is performed by the user. Therefore, it is possible to acquire the channel selection information efficiently also in the portable receiver that is used in an arbitrary place. Accordingly, it is possible to easily select a desired service from services being broadcasted in that place, and to view and listen to it.

4. System Configuration (Configuration of Broadcast Communication System)

Figure 22:
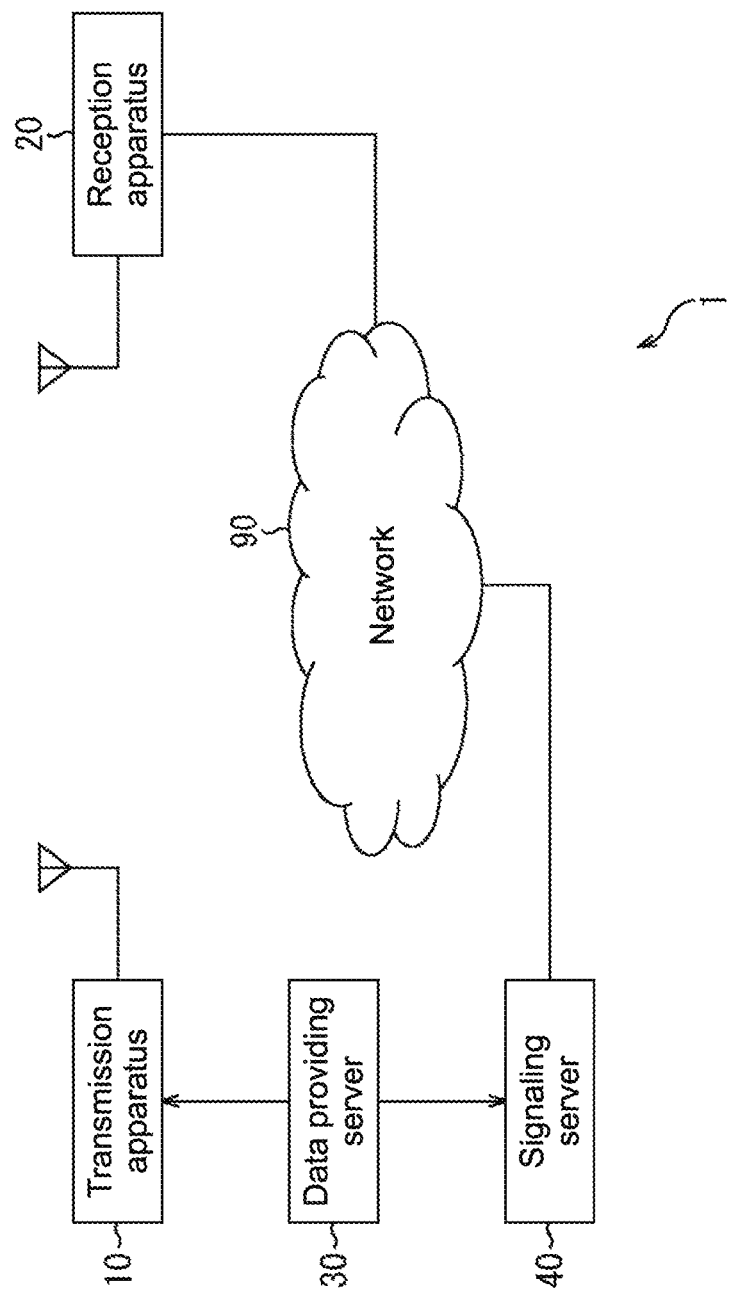
FIG. 22 A diagram showing a configuration example of a broadcast communication system.

FIG. 22 is a diagram showing a configuration example of a broadcast communication system.

As shown in FIG. 22, a broadcast communication system 1 is constituted of a transmission apparatus 10, a reception apparatus 20, a data providing server 30, and a signaling server 40. In FIG. 22, the reception apparatus 20 is connected to the signaling server 40 via a network 90 such as the Internet.

The transmission apparatus 10 transmits, as the broadcast content, AV (Audio Video) content provided from the data providing server 30 through a broadcast wave of the digital broadcasting using the IP transmission system. Note that the broadcast content includes components such as video and audio.

Further, the transmission apparatus 10 uses original data of the signaling information provided from the data providing server 30 to generate the signaling information, and transmits it together with the broadcast content through a broadcast wave of the digital broadcasting using the IP transmission system.

Note that the transmission apparatus 10 corresponds to the above-mentioned transmitter (e.g., FIG. 11 or FIG. 15), and is provided by a broadcaster, for example. Further, a plurality of transmission apparatuses 10 may be placed depending on the operation form.

The reception apparatus 20 receives a broadcast wave of the digital broadcasting that is transmitted from the transmission apparatus 10, and acquires the signaling information transmitted by that broadcast wave of the digital broadcasting. Further, the reception apparatus 20 accesses the signaling server 40 via the network 90, and acquires the signaling information provided from the signaling server 40.

On the basis of the signaling information acquired by broadcasting or communication, the reception apparatus 20 acquires the broadcast content transmitted by a broadcast wave of the digital broadcasting transmitted from the transmission apparatus 10. The reception apparatus 20 displays, on the basis of the components such as video and audio constituting the broadcast content, a picture on the display and outputs sound synchronized with that picture from the speaker.

Note that the reception apparatus 20 corresponds to the above-mentioned portable receiver (e.g., FIG. 11 or FIG. 15), and is held by the user and used in an arbitrary place, for example.

The data providing server 30 provides AV content including components such as video data and audio data to the transmission apparatus 10. Further, the data providing server 30 provides original data of the signaling information to the transmission apparatus 10 and the signaling server 40. Note that the data providing server 30 may generate the signaling information, and provide it to the transmission apparatus 10 and the signaling server 40.

The signaling server 40 uses the original data of the signaling information provided from the data providing server 30 to generate the signaling information. The signaling server 40 provides the signaling information via the network 90 in response to a request from the reception apparatus 20.

Note that the signaling server 40 corresponds to the above-mentioned signaling server (e.g., FIG. 11 or FIG. 15), and is provided by, for example, a broadcaster. Further, a plurality of signaling servers 40 may be placed depending on the operation form. Further, it can be said that the signaling server 40 is a transmission apparatus that transmits the signaling information in response to a request from the reception apparatus 20.

The broadcast communication system 1 is thus configured. Next, detailed configurations of the respective apparatuses constituting the broadcast communication system 1 in FIG. 22 will be described.

(Configuration of Transmission Apparatus)

Figure 23:
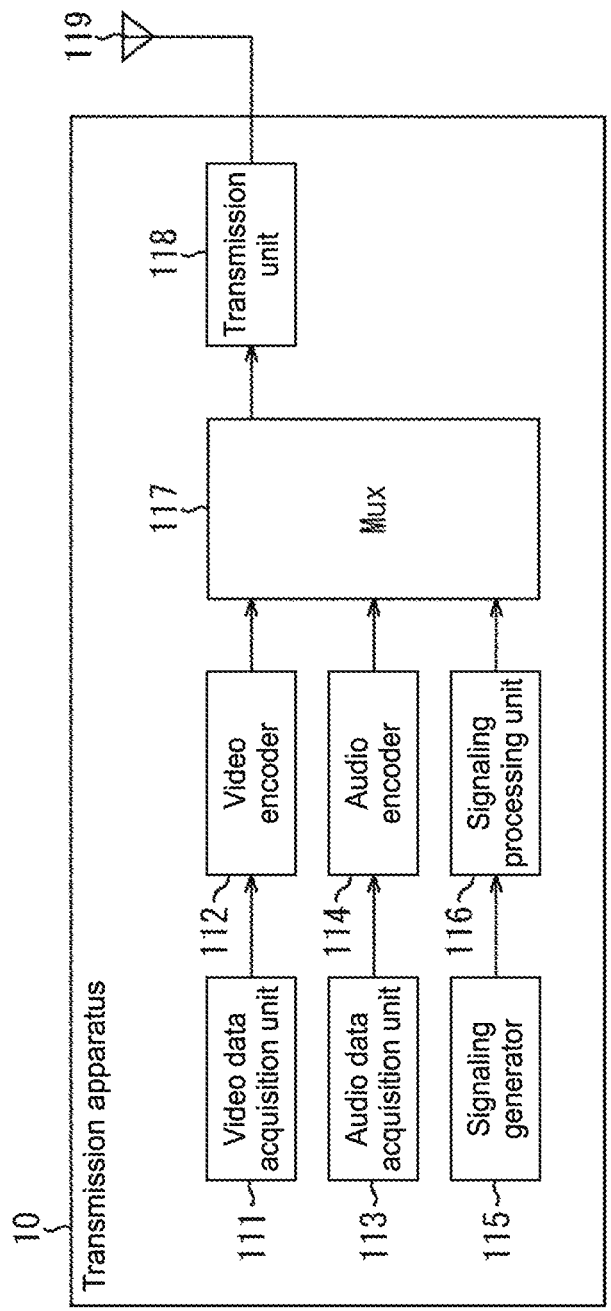
FIG. 23 A diagram showing a configuration example of a transmission apparatus.

FIG. 23 is a diagram showing a configuration example of the transmission apparatus 10 in FIG. 22.

As shown in FIG. 23, the transmission apparatus 10 is constituted of a video data acquisition unit 111, a video encoder 112, an audio data acquisition unit 113, an audio encoder 114, a signaling generator 115, a signaling processing unit 116, a Mux 117, and a transmission unit 118.

The video data acquisition unit 111 acquires video data serving as a component from built-in storage an external server, a camera, or the like, and sullies it to the video encoder 112. The video encoder 112 encodes the video data supplied from the video data acquisition unit 111 in compliance with the encoding method such as MPEG (Moving Picture Experts Group), and supplies it to the Mux 117.

The audio data acquisition unit 113 acquires audio data serving as a component from built-in storage, an external server, a microphone, or the like, and supplies it to the audio encoder 114. The audio encoder 114 encodes the audio data supplied from the audio data acquisition unit 113 in compliance with the encoding method such as MPEG, and supplies it to the Mux 117.

The signaling generator 115 uses the original data of the signaling information provided from the data providing server 30 to generate the signaling information, and supplies it to the signaling processing unit 116. The signaling processing unit 116 processes the signaling information supplied from the signaling generator 115, and supplies it to the Mux 117. Note that in the case where the signaling information is provided from the data providing server 30, the signaling generator 115 supplies the signaling information to the signaling processing unit 116 as it is.

The Mux 117 multiplexes the video data supplied from the video encoder 112, the audio data supplied from the audio encoder 114, and the signaling information supplied from the signaling processing unit 116 to generate a BBP stream in the IP transmission system, and supplies it to the transmission unit 118. The transmission unit 118 transmits, as the digital broadcasting signal, the BBP stream supplied from the Mux 117 via an antenna 119.

(Configuration of Reception Apparatus)

Figure 24:
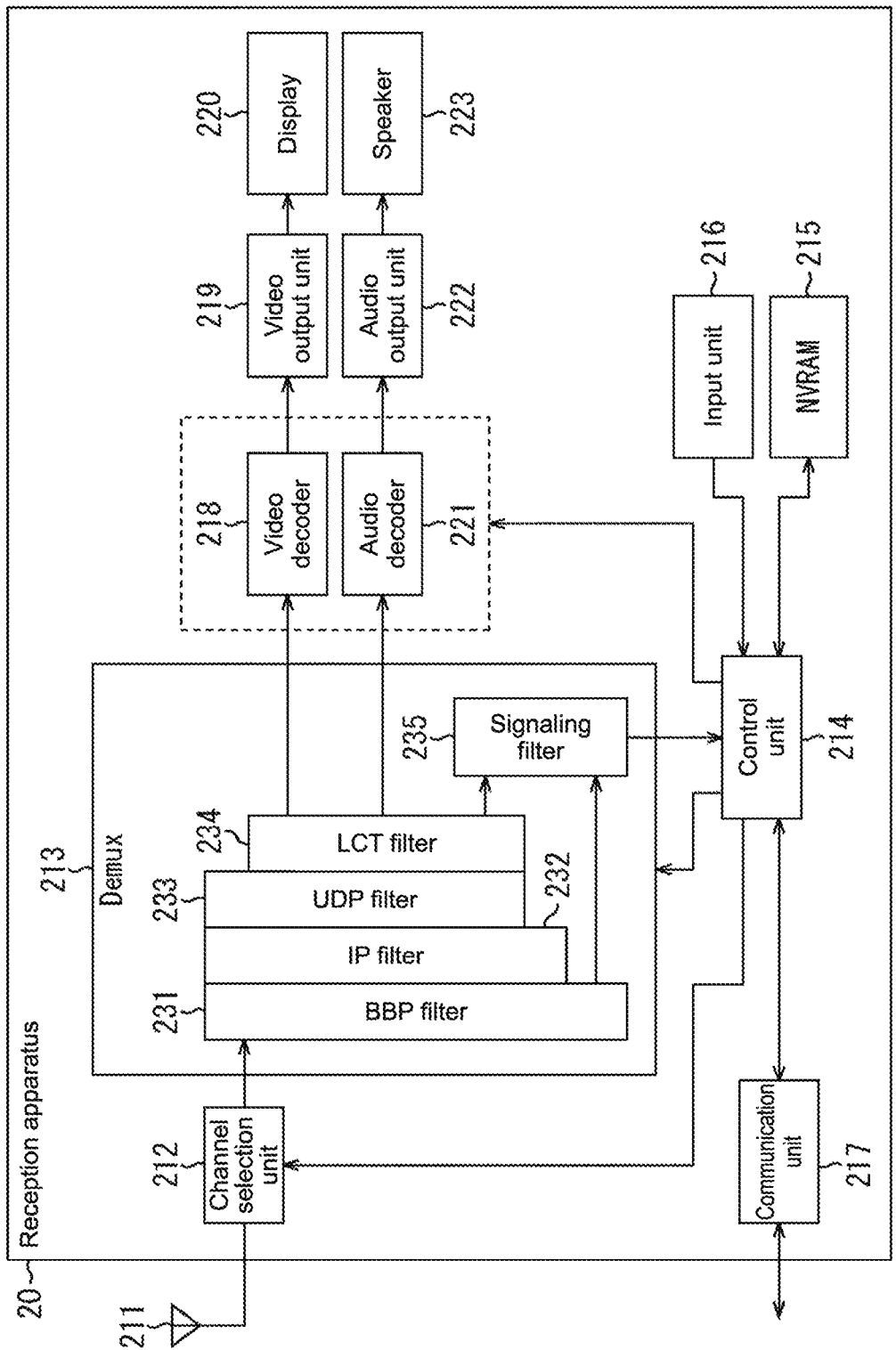
FIG. 24 A diagram showing a configuration example of a reception apparatus.

FIG. 24 is a diagram showing a configuration example of the reception apparatus 20 in FIG. 22.

As shown in FIG. 24, the reception apparatus 20 is constituted of an antenna 211, a channel selection unit 212, a Demux 213, a control unit 214, an NVRAM 215, an input unit 216, a communication unit 217, a video decoder 218, a video output unit 219, a display 220, an audio decoder 221, an audio output unit 222, and a speaker 223.

Under the control of the control unit 214, the channel selection unit 212 extracts, from the digital broadcasting signal received by the antenna 211, the digital broadcasting signal of a service, with respect to which a selection instruction has been made, demodulates it, and supplies the resulting BBP stream in the IP transmission system to the Demux 213. Note that the detailed configuration of the channel selection unit 212 will be described later with reference to FIG. 25.

Under the control of the control unit 214, the Demux 213 demultiplexes the BBP stream in the IP transmission system supplied from the channel selection unit 212 into the video data, audio data, and signaling information, and outputs them to a block at the subsequent stage. Specifically, the Demux 213 is constituted of a BBP filter 231, an IP filter 232, a UDP filter 233, an LCT filter 234, and a signaling filter 235. The BBP filter 231 performs filtering processing on the basis of the BBP header, and supplies the LLS to the signaling filter 235.

The IP filter 232 performs filtering processing on the basis of the IP header. On the other hand, the UDP filter 233 performs filtering processing on the basis of the UDP header. The LCT filter 234 performs filtering processing on the basis of the LCT header. By the filtering processing performed by the IP filter 232 to the LCT filter 234, the video data serving as a component is supplied to the video decoder 218 and the audio data is supplied to the audio decoder 221.

Note that although it is not necessary to acquire the SCS by broadcasting in the reception apparatus 20, the scs is supplied to the signaling filter 235 by the filtering processing performed by the IP filter 232 by the LCT filter 234 if the SCS is acquired not by communication but by broadcasting.

The signaling filter 235 performs filtering processing on the basis of various headers or the like, and appropriately supplies the signaling information (LLS) to the control unit 214. Note that in the case where a component is transmitted in the FLUTE session, two pieces of identification information of the TSI and the TOI are used to restore various types of file data.

The control unit 214 controls, on the basis of the signaling information supplied from the signaling filter 235, operations of the respective units constituting the reception apparatus 20. The NVRAM 215 is a non-volatile memory, and stores, under the control of the control unit 214, various types of data. The input unit 216 supplies an operation signal to the control unit 214 in response to a user's operation. The control unit 214 controls operations of the respective units constituting the reception apparatus 20 in response to the operation signal supplied from the input unit 216.

Under the control of the control unit 214, the communication unit 217 accesses the signaling server 40 via the network 90, and receives the signaling information (SCS). The communication unit 217 supplies, to the control unit 214, the signaling information (SCS) supplied from the signaling server 40. The control unit 214 controls operations of the respective units constituting the reception apparatus 20 on the basis of the signaling information (SCS) supplied from the communication unit 217.

Under the control of the control unit 214, the video decoder 218 decodes the video data supplied from the Demux 213 in the decoding method corresponding to the video encoder 112 (FIG. 23), and supplies it to the video output unit 219. The video output unit 219 supplies, to the display 220, the video data supplied from the video decoder 218. Accordingly, on the display 220, the picture of the broadcast content is displayed.

Under the control of the control unit 214, the audio decoder 221 decodes the audio data supplied from the Demux 213 in the decoding method corresponding to the audio encoder 114 (FIG. 23), and supplies it to the audio output unit 222. The audio output unit 222 supplies, to the speaker 223, the audio data supplied from the audio decoder 221. Accordingly, the sound synchronized with the picture of the broadcast content is output from the speaker 223.

Note that the reception apparatus 20 further includes a browser for executing an application constituted of an HTML file or the like, and a GPS processing unit for acquiring location information, although they are not shown in the configuration example in FIG. 24 for simplifying the description.

(Detailed Configuration of Channel Selection Unit)

Figure 25:
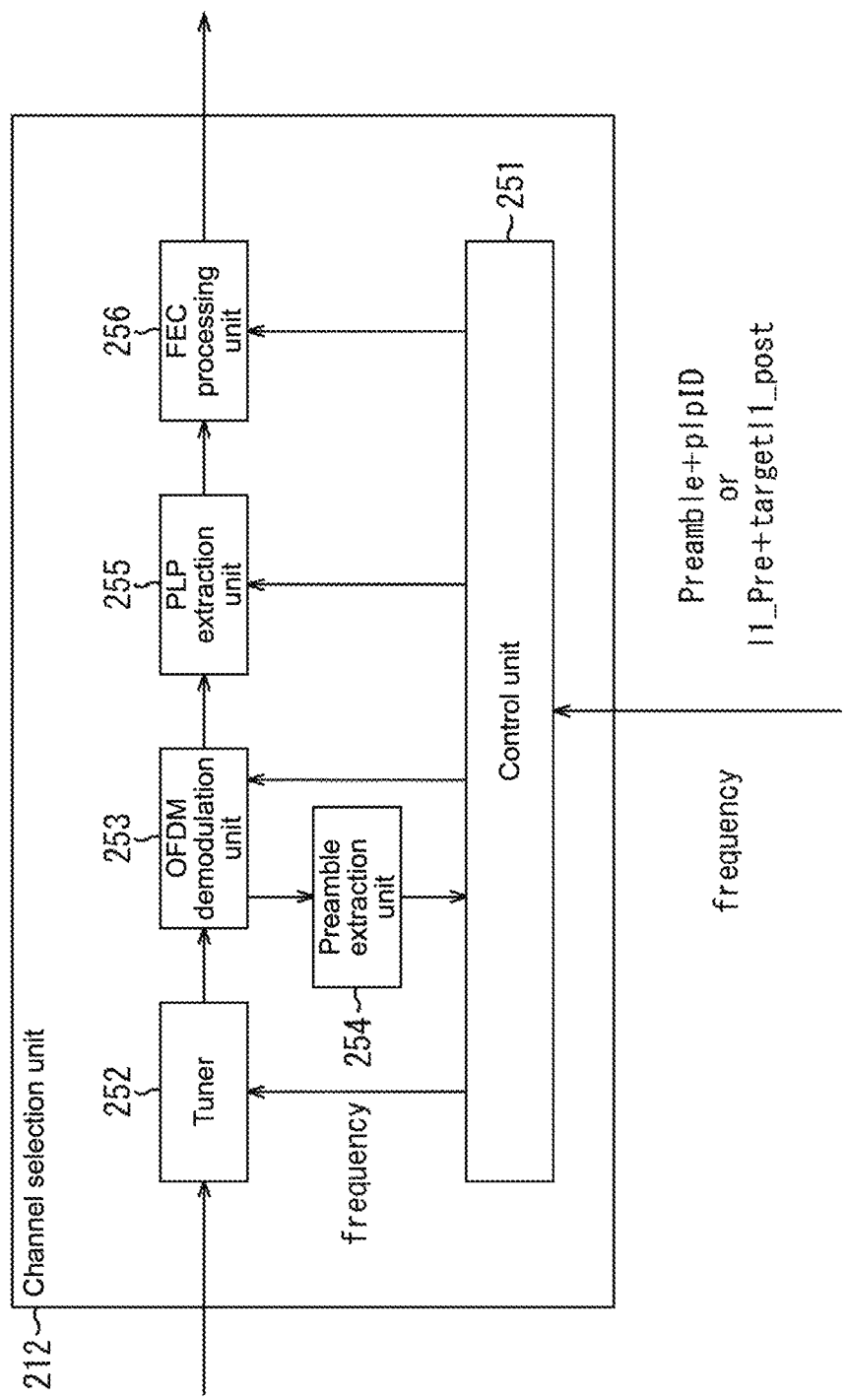
FIG. 25 A diagram showing a detailed configuration example of a channel selection unit.

FIG. 25 is a diagram showing a detailed configuration example of the channel selection unit 212 in FIG. 24.

As shown in FIG. 25, the channel selection unit 212 is constituted of a control unit 251, a tuner 252, an OFDM demodulation unit 253, a preamble extraction unit 254, a PLP extraction unit 255, and a FEC processing unit 256.

The control unit 251 controls, on the basis of the channel selection information (physical parameter) supplied from the control unit 214 (FIG. 24), operations of the respective units constituting the channel selection unit 212.

Under the control of the control unit 251 using an intermediate frequency, the tuner 252 extracts, from the digital broadcasting signal received by the antenna 211 (FIG. 24), the digital broadcasting signal of a service, with respect to which a selection instruction has been made, and supplies it to the OFDM demodulation unit 253.

Under the control of the control unit 251 using a parameter for demodulation, the OFDM demodulation unit 253 performs OFDM (Orthogonal Frequency Division Multiplexing) demodulation on the digital broadcasting signal supplied from the tuner 252, and supplies it to the preamble extraction unit 254 and the PLP extraction unit 255. The preamble extraction unit 254 extracts a preamble obtained by the OFDM demodulation, and supplies it to the control unit 251. The control unit 251 uses the preamble supplied from the preamble extraction unit 254 to control operations of the respective units constituting the channel selection unit 212.

Note that the OFDM method is a method of preparing many subcarriers perpendicular to each other in the transmission band, assigning data to the amplitude and phase of the subcarriers, and performing digital modulation with PSK (Phase Shift Keying) or QAM (Quadrature Amplitude Modulation).

Under the control of the control unit 251 using a parameter for PLP such as a PLP ID, the PLP extraction unit 255 extracts one BBP stream out of the plurality of BBP streams obtained by the OFDM demodulation, and supplies it to the FEC processing unit 256. Under the control of the control unit 251 using a parameter for FEC, the FEC processing unit 256 performs forward error correction (FEC) processing on the BBP stream extracted by the PLP extraction unit 255, and supplies the error-corrected BBP stream to the Demux 213 (FIG. 24).

Note that in the channel selection unit 212 shown in FIG. 25, instead of the control unit 251, the control unit 214 (FIG. 24) may directly control the tuner 252 to the FEC processing unit 256.

(Detailed Configuration of Control Unit)

Figure 26:
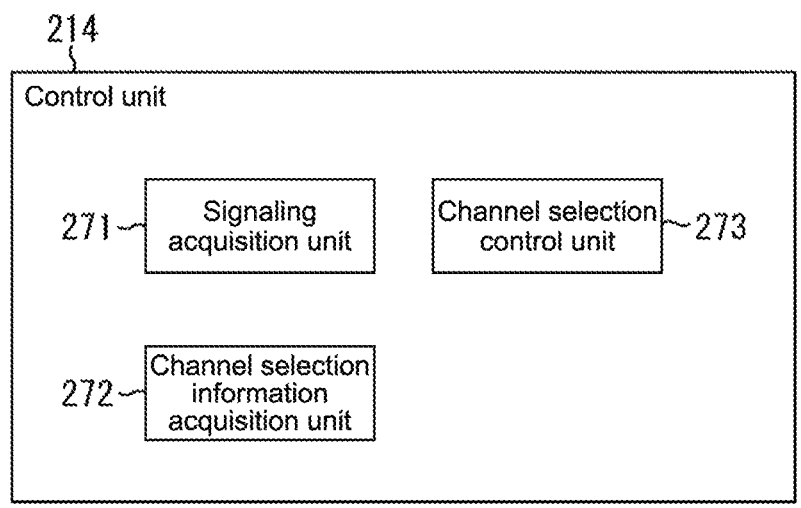
FIG. 26 A diagram showing a detailed configuration example of a control unit.

FIG. 26 is a diagram showing a functional configuration example of a part of the control unit 214 shown in FIG. 24, which performs channel selection•processing.

As shown in FIG. 26, the control unit 214 includes a signaling acquisition unit 271, a channel selection information acquisition unit 272, and a channel selection control unit 273.

By controlling the communication unit 217 (FIG. 24), the signaling acquisition unit 271 accesses the signaling server 40 via the network 90, acquires the signaling information (SCS), and supplies it to the channel selection information acquisition unit 272.

The channel selection information acquisition unit 272 acquires, on the basis of the signaling information (SDP) supplied from the signaling acquisition unit 271, the channel selection information, and supplies it to the channel selection control unit 273.

The channel selection control unit 273 controls, on the basis of the channel selection information (physical parameter) supplied from the channel selection information acquisition unit 272, the channel selection processing performed by the channel selection unit 212.

(Configuration of Signaling Server)

Figure 27:
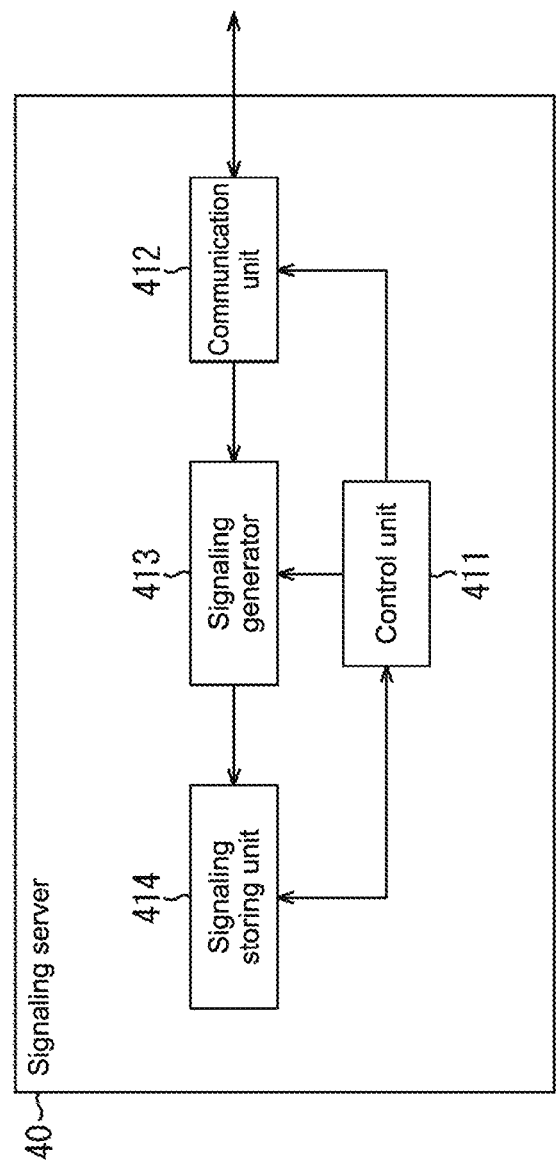
FIG. 27 A diagram showing a configuration example of a signaling server.

FIG. 27 is a diagram showing a configuration example of the signaling server 40 shown in FIG. 22.

As shown in FIG. 27, the signaling server 40 is constituted of a control unit 411, a communication unit 412, a signaling generator 413, and a signaling storing unit 414.

The control unit 411 controls operations of the respective units constituting the signaling server 40. Under the control of the control unit 411, the communication unit 412 supplies, to the signaling generator 413, the original data of the signaling information provided from the data providing server 30.

Under the control of the control unit 411, the signaling generator 413 generates, on the basis of the original data of the signaling information supplied from the communication unit 412, the signaling information (e.g., SCS), and causes the signaling storing unit 414 to store it. Note that in the case where the SCS such as USD, MPD, SDP, and FDD is generated as the signaling information, the files thereof may be treated as one file in a ZIP file format.

The control unit 411 constantly monitors the communication condition of the communication unit 412, reads and acquires the signaling information stored in the signaling storing unit 414, and supplies it to the communication unit 412, in the case where the signaling information is requested from the reception apparatus 20. Under the control of the control unit 411, the communication unit 412 transmits the signaling information to the reception apparatus 20 via the network 90.

5. Flows of Processing Performed by Apparatuses

Next, a flow of processing performed by the respective apparatuses constituting the broadcast communication system 1 in FIG. 22 will be described with reference to the flowcharts in FIGS. 28 to 32.

(Digital Broadcasting Signal Transmission Processing)

Figure 28:
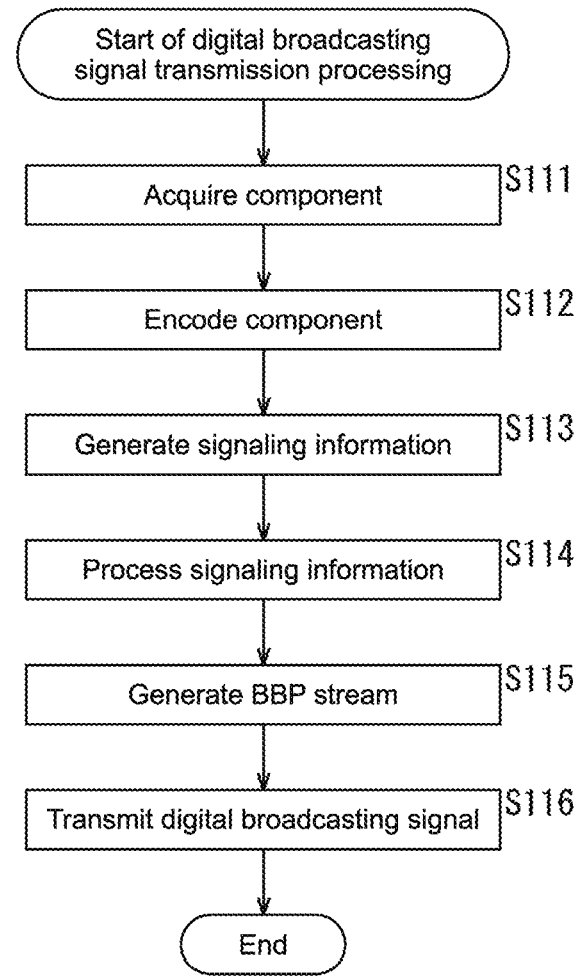
FIG. 28 A flowchart explaining digital broadcasting signal transmission processing.

First, referring to a flowchart in FIG. 28, the digital broadcasting signal transmission processing performed by the transmission apparatus 10 shown in FIG. 22 will be described.

In Step S111, the video data acquisition unit 111 acquires video data serving as a component from storage, a server, or the like, and supplies it to the video encoder 112. The audio data acquisition unit 113 acquires audio data serving as a component from storage, an external server, or the like, and supplies it to the audio encoder 114.

In Step S112, the video encoder 112 encodes the video data supplied from the video data acquisition unit 111 in compliance with the encoding method such as MPEG, and supplies it to the Mux 117. The audio encoder 114 encodes the audio data supplied from the audio data acquisition unit 113 in compliance with the encoding method such as MPEG, and supplies it to the Mux 117.

In Step S113, the signaling generator 115 uses the original data of the signaling information provided from the data providing server 30 to generate the signaling information, and supplies it to the signaling processing unit 116. In Step S114, the signaling processing unit 116 processes the signaling information supplied from the signaling generator 115, and supplies it to the Mux 117.

In Step S115, the Mux 117 multiplexes the video data supplied from the video encoder 112, the audio data supplied from the audio encoder 114, and the signaling information supplied from the signaling processing unit 116 to generate the BBP stream in the IP transmission system, and supplies it to the transmission unit 118.

In Step S116, the transmission unit 118 transmits the BBP stream supplied from the Mux 117 as the digital broadcasting signal via the antenna 119. When the processing of Step S116 is finished, the digital broadcasting signal transmission processing shown in FIG. 28 is finished.

In the above, the digital broadcasting signal transmission processing has been described.

(Digital Broadcasting Signal Reception Processing)

Next, the digital broadcasting signal reception processing performed by the reception apparatus 20 shown in FIG. 22 will be described with reference to the flowchart in FIG. 29.

In Step S211, the control unit 214 determines, on the basis of the operation signal supplied from the input unit 216, whether or not a channel selection operation of a service has been performed by the user. In the case where it is determined that the channel selection operation has not been performed by the user in Step S211, the determination processing of Step S211 is repeated.

In Step S211, after the channel selection operation of a service is performed by the user, the processing proceeds to Step S212. Herein, a desired service is selected from the list of services (programs) that can be used depending on the current position presented by the application, for example.

In Step S212, by controlling the communication unit 217, the signaling acquisition unit 271 accesses the signaling server 40 via the network 90 to acquire the signaling information.

In Step S213, the channel selection information acquisition unit 272 performs the channel selection information acquisition processing. In this channel selection information acquisition processing, the channel selection information acquisition unit 272 acquires, on the basis of the signaling information (SDP) supplied from the signaling acquisition unit 271, the channel selection information (physical parameter). Note that detailed content of the channel selection information acquisition processing will be described later with reference to the flowchart in FIG. 30 or FIG. 31.

In Step S214, the channel selection control unit 273 controls, on the basis of the channel selection information (physical parameter) acquired in the processing of Step S213, the channel selection unit 212 to perform channel selection processing. By this channel selection•processing, the digital broadcasting signal of a service, with respect to which a selection instruction has been made in the processing of Step S211, is extracted from the digital broadcasting signal received by the antenna 211, and demodulated to acquire the BBP stream.

In Step S215, the control unit 214 controls, on the basis of the signaling information (SCS) acquired in the processing of Step S212, the Demux 213 to perform filtering processing. By this filtering processing, video data and audio data are acquired from the BBP stream supplied from the channel selection unit 212, and supplied to the video decoder 218 and the audio decoder 221.

In Step S216, the video decoder 218 decodes, under the control of the control unit 214, the video data supplied from the Demux 213 in the decoding method corresponding to the video encoder 112 (FIG. 23), and supplies it to the video output unit 219. The audio decoder 221 decodes, under the control of the control unit 214, the audio data supplied from the Demux 213 in the decoding method corresponding to the audio encoder 114 (FIG. 23), and supplies it to the audio output unit 222.

In Step S217, the video output unit 219 supplies, to the display 220, the video data supplied from the video decoder 218. The audio output unit 222 supplies, to the speaker 223, the audio data supplied from the audio decoder 221. Accordingly, the picture of the broadcast content is displayed on the display 220, and the sound synchronized with the picture is output from the speaker 223.

Figure 29:
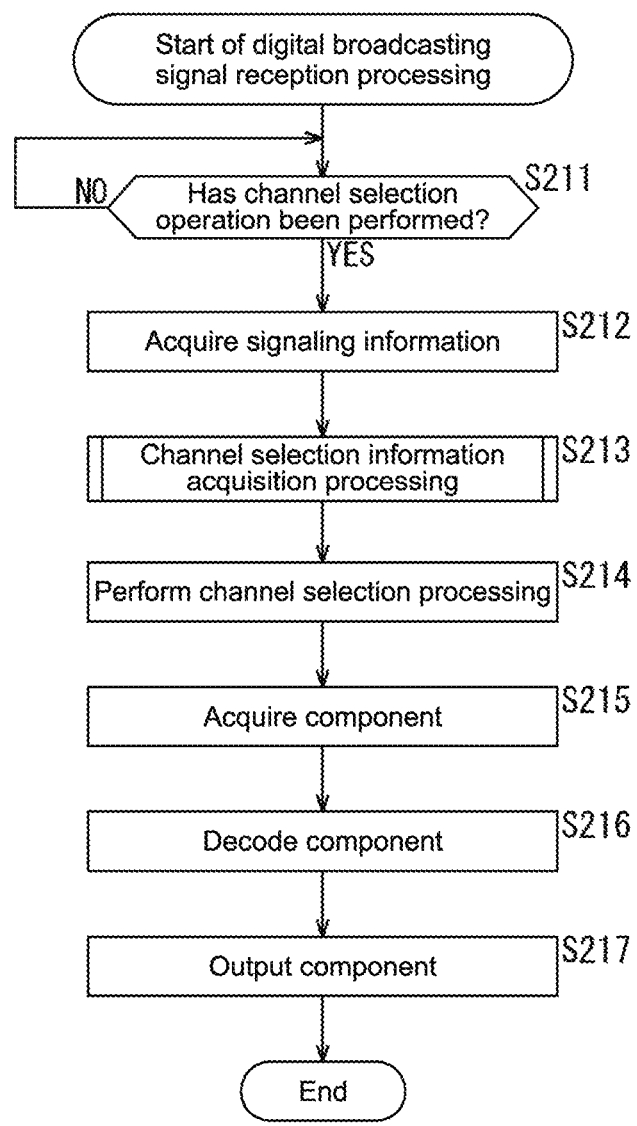
FIG. 29 A flowchart explaining digital broadcasting signal reception processing.

When the processing of Step S217 is finished, the digital broadcasting signal reception processing shown in FIG. 29 is finished.

In the above, the digital broadcasting signal reception processing has been described.

(First Channel Selection Information Acquisition Processing)

Figure 30:
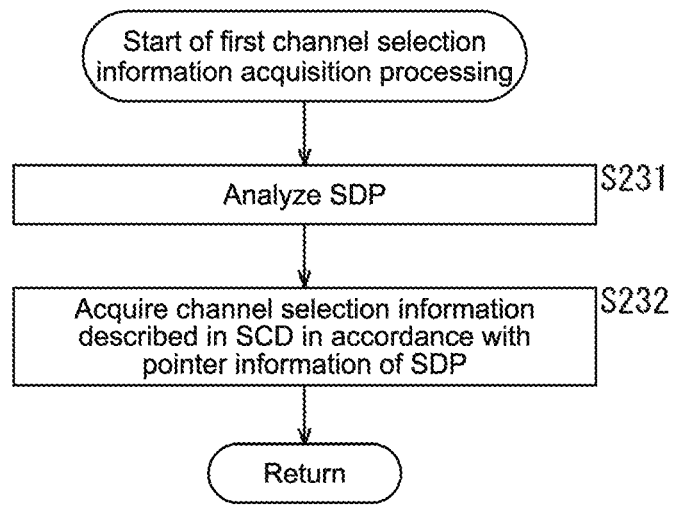
FIG. 30 A flowchart explaining first channel selection information acquisition processing.

Next, detailed content of the first channel selection information acquisition processing corresponding to the processing of Step S213 shown in FIG. 29 will be described with reference to the flowchart in FIG. 30.

In Step S231, the channel selection information acquisition unit 272 analyzes the SDP acquired from the signaling server 40. When the analysis processing of Step S231 is finished, the processing proceeds to Step S232.

In Step S232, the channel selection information acquisition unit 272 acquires, on the basis of the analysis results obtained in the processing of Step S231, the channel selection information (physical parameter) described in the SCD in accordance with the pointer information of the SDP. When the processing of Step S232 is finished, the processing returns to Step S213 shown in FIG. 29, and the subsequent processing is performed.

In the above, the first channel selection information acquisition processing has been described. This first channel selection information acquisition processing is processing corresponding to the above-mentioned first embodiment, and by describing, in the SDP, the pointer information for accessing the channel selection information (physical parameter) included in the SCD, the channel selection information (physical parameter) is acquired from the SCD in accordance with the pointer information in the case where the channel selection operation of a service has been performed by the user.

(Second Channel Selection Information Acquisition Processing)

Figure 31:
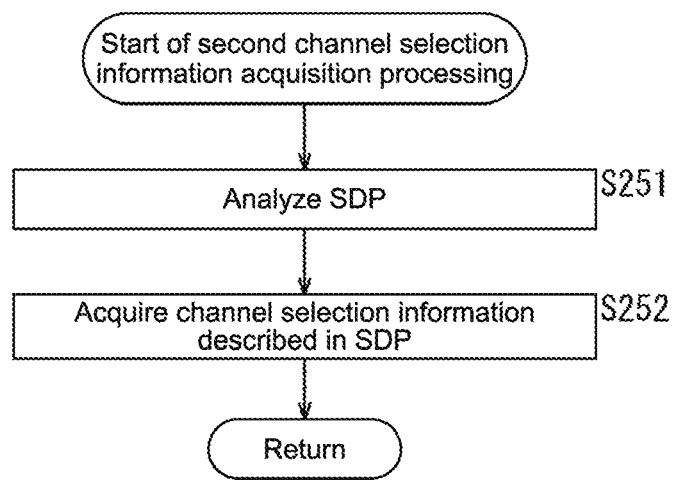
FIG. 31 A flowchart explaining second channel selection information acquisition processing.

Next, detailed content of the second channel selection information acquisition processing corresponding to the processing of Step S213 shown in FIG. 29 will be described with reference to the flowchart in FIG. 31.

In Step S251, the channel selection information acquisition unit 272 analyzes the SDP acquired from the signaling server 40. When the analysis processing of Step S251 is finished, the processing proceeds to Step S252.

In Step S252, the channel selection information acquisition unit 272 acquires, on the basis of the analysis results obtained in the processing of Step S251, the channel selection information (physical parameter) described in the SDP. When the processing of Step S252 is finished, the processing returns to Step S213 shown in FIG. 29, and the subsequent processing is performed.

In the above, the second channel selection information acquisition processing has been described. This second channel selection information acquisition processing is processing corresponding to the above-mentioned second embodiment, and by directly describing, in the SDP, the channel selection information (physical parameter), the channel selection information (physical parameter) is acquired in the case where the channel selection operation of a service has been performed by the user.

(Signaling Providing Processing)

Figure 32:
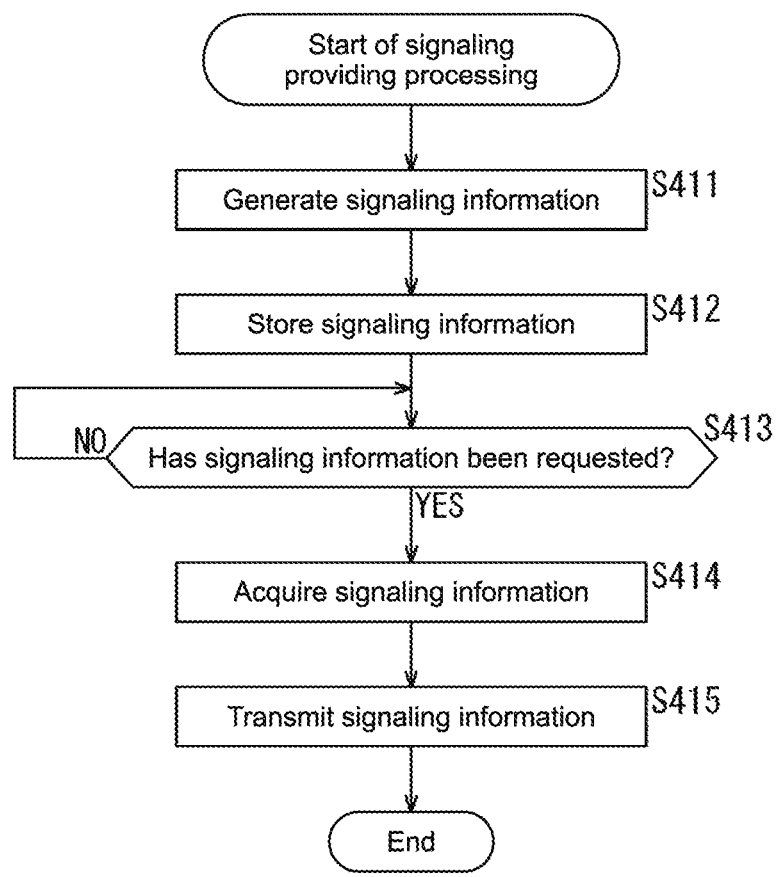
FIG. 32 A flowchart explaining signaling providing processing.

Finally, signaling providing processing performed by the signaling server 40 shown in FIG. 22 will be described with reference to the flowchart in FIG. 32.

In Step S411, the signaling generator 413 generates, under the control of the control unit 411, the signaling information on the basis of the original data of the signaling information supplied from the communication unit 412. In Step S412, the signaling storing unit 414 stores the signaling information generated in the processing of Step S411.

In Step S413, the control unit 411 constantly monitors the communication condition of the communication unit 412, and determines whether or not the signaling information has been requested from the reception apparatus 20. In the case where it is determined that the signaling information has not been requested from the reception apparatus 20 in Step S413, the determination processing of Step S413 is repeated.

In Step S413, after the signaling information is requested from the reception apparatus 20, the processing proceeds to Step S414.

In Step S414, the control unit 411 reads and acquires the signaling information stored in the signaling storing unit 414, and supplies it to the communication unit 412. In Step S415, the communication unit 412 transmits (provides), under the control of the control unit 411, the signaling information to the reception apparatus 20 via the network 90. When the processing of Step S415 is finished, the signaling providing processing shown in FIG. 32 is finished.

In the above, the signaling providing processing has been described.

6. Modified Example

Note that although the AV content viewed by the reception apparatus 20 is transmitted by broadcasting as the broadcast content in the above description, a streaming server may be provided on the network 90 to stream and deliver the content as communication content.

Further, although the USD, MPD, SDP, and FDD are transmitted as the SCS in the above description, the SCS may include other signaling information such as SPD (Service Parameter Description) and IS (Initialization Segment), for example. Herein, the SPD includes various parameters defined at a service level. On the other hand, the IS is control information that is, if (files of) the components are segmented and transmitted as segments complying with the ISO Base Media File Format standard, transmitted together with media segments storing segment data. Note that the IS is transmitted in units of components such as video and audio. Further, these signaling information items are described with a markup language, for example, an XML.

Further, the SCD is transmitted as the LLS in the above description. However, the LLS may include, for example, other signaling information such as EAD (Emergency Alerting Description) and RRD (Region Rating Description). Herein, the EAD includes information relating to emergency notice. On the other hand, the RRD includes rating information. Note that these signaling information items are described with a markup language, for example, an XML.

Further, although "D" that is the abbreviation of Description is used as the name of the signaling information in the above description, "T" that is the abbreviation of Table may be used. For example, the SCD (Service Configuration Description) may be described as an SCT (Service Configuration Table). Further, for example, the SPD (Service Parameter Description) may be described as an SPT (Service Parameter Table). It should be noted that the difference of those names is a formal difference between "Description" and "Table" and the substantial contents of the signaling information items are not different.

8. Configuration of Computer

Figure 33:
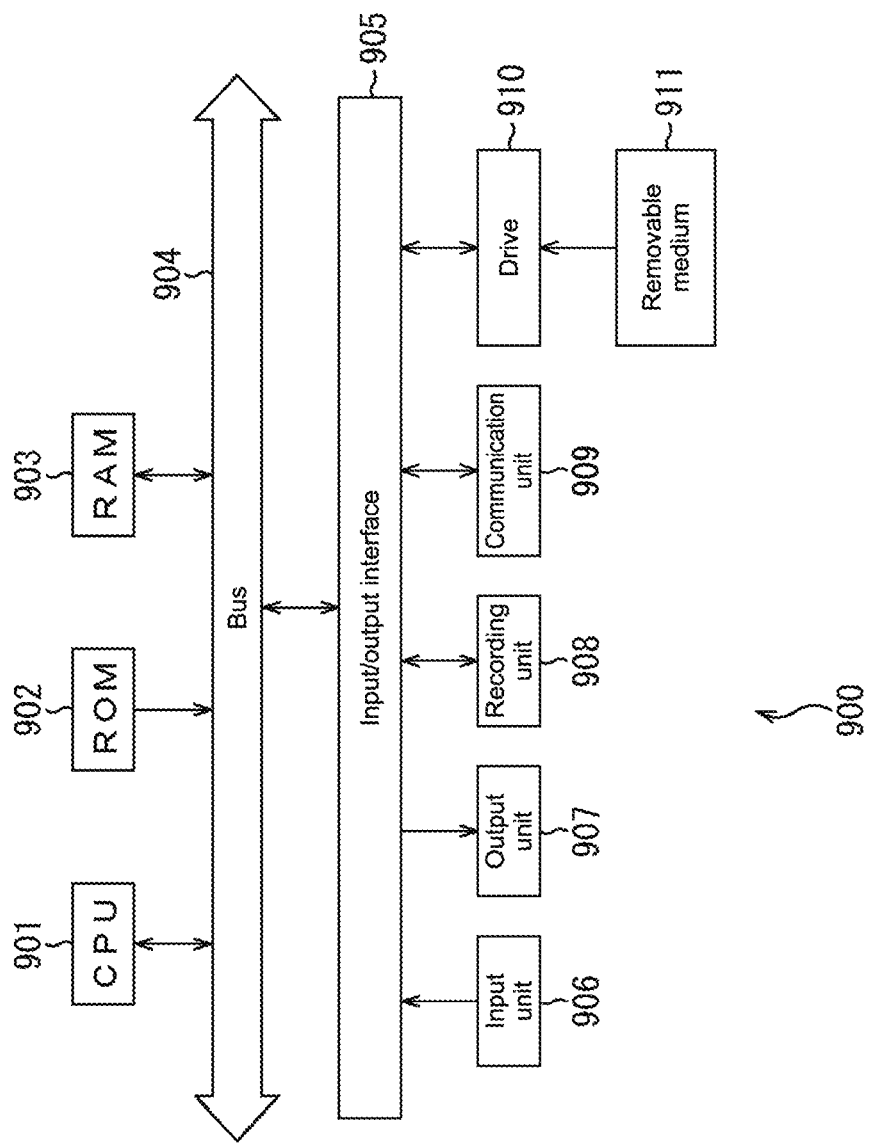
FIG. 33 A diagram showing a configuration example of a computer.

The above-mentioned series of processing may be executed by hardware or may be executed by software. If the series of processing is executed by software, programs configuring that software are installed into a computer. FIG. 33 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

It should be noted that the present technology may take the following configurations.

(1)

A reception apparatus, including:

a reception unit that receives a broadcast wave of digital broadcasting using an IP (Internet Protocol) transmission system;

a communication unit that receives first signaling information for acquiring broadcast content transmitted by the broadcast wave through communication with a server via a network;

an acquisition unit that acquires, on the basis of the first signaling information, a physical parameter used in a physical layer in a hierarchy of a protocol of the IP transmission system; and a control unit that controls, on the basis of the physical parameter, operations of respective units that perform channel selection processing.

(2)

The reception apparatus according to (1), in which the acquisition unit acquires, on the basis of pointer information included in the first signaling information, the physical parameter included in second signaling information transmitted in a second layer, the second layer being a lower layer than a first layer in the hierarchy of the protocol of the IP transmission system, the first signaling information being transmitted in the first layer.

(3)

The reception apparatus according to (2), in which the pointer information is information for accessing the physical parameter in a particular service in accordance with a channel selection operation.

(4)

The reception apparatus according to (3), in which the pointer information includes a country code assigned to each country, a first identifier assigned to each broadcaster as a unique value, a second identifier assigned to each stream as a unique value, and a third identifier assigned to each service as a unique value.

(5)

The reception apparatus according to any one of (2) to (4), in which the first signaling information is an SDP (Session Description Protocol), and the second signaling information is an SCD (Service Configuration Description).

(6)

The reception apparatus according to (1), in which the acquisition unit acquires the physical parameter included in the first signaling information.

(7)

The reception apparatus according to (6), in which the physical parameter includes a center frequency, an identifier for identifying a PLP (Physical Layer Pipe), and a value of a preamble included in a frame defined in the IP transmission system.

(8)

The reception apparatus according to (6), in which the physical parameter includes a center frequency, a value of an L1-pre signaling constituting a preamble included in a frame defined in the IP transmission system, and a value of a target PLP (Physical Layer Pipe) of L1-post signaling constituting the preamble.

(9)

The reception apparatus according to any one of (6) to (8), in which the first signaling information is an SDP (Session Description Protocol).

(10)

A reception method for a reception apparatus, including the steps of, by the reception apparatus:

receiving a broadcast wave of digital broadcasting using an IP transmission system;

receiving first signaling information for acquiring broadcast content transmitted by the broadcast wave through communication with a server via a network;

acquiring, on the basis of the first signaling information, a physical parameter used in a physical layer in a hierarchy of a protocol of the IP transmission system; and controlling, on the basis of the physical parameter, operations of respective units that perform channel selection processing.

(11)

A transmission apparatus, including:

a generator that generates first signaling information for acquiring broadcast content transmitted by a broadcast wave of digital broadcasting using an IP (Internet Protocol) transmission system, the first signaling information including information on a physical parameter used in a physical layer in a hierarchy of a protocol of the IP transmission system; and a transmission unit that transmits the first signaling information to a receiver via a network in response to a request from the receiver.

(12)

The transmission apparatus according to (11), in which the first signaling information includes pointer information for accessing the physical parameter included in second signaling information transmitted in a second layer, the second layer being a lower layer than a first layer in the hierarchy of the protocol of the IP transmission system, the first signaling information being transmitted in the first layer.

(13)

The transmission apparatus according to (12), in which the pointer information is information for accessing the physical parameter in a particular service in accordance with channel selection operation.

(14)

The transmission apparatus according to (13), in which the pointer information includes a country code assigned to each country, a first identifier assigned to each broadcaster as a unique value, a second identifier assigned to each stream as a unique value, and a third identifier assigned to each service as a unique value.

(15)

The transmission apparatus according to any one of (12) to (14), in which the first signaling information is an SDP (Session Description Protocol), and the second signaling information is an SCD (Service Configuration Description).

(16)

The transmission apparatus according to (11), in which the first signaling information includes the physical parameter.

(17)

The transmission apparatus according to (16), in which the physical parameter includes a center frequency, an identifier for identifying a PLP (Physical Layer Pipe), and a value of a preamble included in a frame defined in the IP transmission system.

(18)

The transmission apparatus according to (16), in which the physical parameter includes a center frequency, a value of L1-pre signaling constituting a preamble included in a frame defined in the IP transmission system, and a value of a target PLP (Physical Layer Pipe) of L1-post signaling constituting the preamble.

(19)

The transmission apparatus according to any one of (16) to (18), in which the first signaling information is an SDP (Session Description Protocol).

(20)

A transmission method for a transmission apparatus, including the steps of, by the transmission apparatus:

generating first signaling information for acquiring broadcast content transmitted by a broadcast wave of digital broadcasting using an IP (Internet Protocol) transmission system, the first signaling information including information on a physical parameter used in a physical layer in a hierarchy of a protocol of the IP transmission system; and transmitting the first signaling information to a receiver via a network in response to a request from the receiver.

DESCRIPTION OF REFERENCE NUMERALS 1 broadcast communication system, 10 transmission apparatus, 20 reception apparatus, 30 data providing server, 40 signaling server, 90 network, 111 video data acquisition unit, 113 audio data acquisition unit, 115 signaling generator, 117 Mux, 118 transmission unit, 212 channel selection unit, 213 Demux, 214 control unit, 217 communication unit, 271 signaling acquisition unit, 272 channel selection information acquisition unit, 273 channel selection control unit, 900 computer, 901 CPU

The invention claimed is:

1. A reception apparatus, comprising:
a receiver configured to receive a digital broadcast signal via a first communication path using an IP (Internet Protocol) transmission system; and
circuitry coupled to the receiver and configured to:
acquire first signaling information for acquiring at least one component of audio components or video components of a service channel of broadcast content, the at least one component being included in the digital broadcast signal, wherein the first signaling information is service channel signaling including at least one of a user service description or a media presentation description provided in the service channel together with the at least one component of the audio components or the video components of the service channel;
acquire second signaling information relating to characteristics of at least one service channel included in the broadcast content, wherein the second signaling information includes physical parameter information, and is conveyed via low level signaling; and
perform channel selection and acquire the at least one component based on the first signaling information and the characteristics of the at least one service channel included in the second signaling information.

2. The reception apparatus according to claim 1, further comprising a display, the circuitry being coupled to the display and being configured to cause at least one of the video components of the service channel to be displayed by the display.

3. The reception apparatus according to claim 1, wherein the physical parameter information includes a physical layer pipe identifier.

4. The reception apparatus according to claim 1, wherein the second signaling information is gathered and stored in a memory during an initial scanning processing.

5. The reception apparatus according to claim 1, wherein the second signaling information is transmitted in a second layer different from a first layer in a hierarchy of a protocol of the IP transmission system in which the first signaling information is transmitted.

6. The reception apparatus according to claim 1, wherein the physical parameter information includes a value in L1 signaling.

7. The reception apparatus according to claim 1, wherein the physical parameter information includes a frequency of the digital broadcast signal.

8. The reception apparatus according to claim 1, wherein the physical parameter information includes a value of a parameter of a physical layer in a hierarchy of a protocol of the IP transmission system.

9. The reception apparatus according to claim 1, wherein the physical parameter information includes a value in a preamble included in a frame defined in the IP transmission system.

10. A reception method for a reception apparatus, comprising:
receiving a digital broadcast signal via a first communication path using an IP (Internet Protocol) transmission system;
acquiring first signaling information for acquiring at least one component of audio components or video components of a service channel of broadcast content, the at least one component being included in the digital broadcast signal, wherein the first signaling information is service channel signaling including at least one of a user service description or a media presentation description provided in the service channel together with the at least one component of the audio components or the video components of the service channel;
acquiring second signaling information relating to characteristics of at least one service channel included in the broadcast content, wherein the second signaling information includes physical parameter information, and is conveyed via low level signaling; and
performing channel selection and acquiring the at least one component based on the first signaling information and the characteristics of the at least one service channel included in the second signaling information.

11. The reception method according to claim 10, wherein the physical parameter information includes a physical layer pipe identifier.

12. The reception method according to claim 10, wherein the second signaling information is gathered and stored in a memory of the reception apparatus during an initial scanning processing.

13. The reception method according to claim 10, wherein the second signaling information is transmitted in a second layer different layer from a first layer in a hierarchy of a protocol of the IP transmission system in which the first signaling information is transmitted.

14. The reception method according to claim 10, wherein the physical parameter information includes a value in L1 signaling.

15. The reception method according to claim 10, wherein the physical parameter information includes a frequency of the digital broadcast signal.

16. The reception method according to claim 10, wherein the physical parameter information includes a value of a parameter of a physical layer in a hierarchy of a protocol of the IP transmission system.

17. The reception method according to claim 10, wherein the physical parameter information includes a value in a preamble included in a frame defined in the IP transmission system.

* * * * *